United States Patent
Takano et al.

(10) Patent No.: US 6,311,505 B1
(45) Date of Patent: Nov. 6, 2001

(54) VEHICLE AIR CONDITIONER WITH WINDSHIELD ANTI-FOG FEATURE

(75) Inventors: Yoshiaki Takano, Kosai; Satoshi Izawa, Kariya; Yasushi Yamanaka, Nakashima-gun; Hajime Ito, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/431,809

(22) Filed: Nov. 2, 1999

(30) Foreign Application Priority Data

Nov. 10, 1998 (JP) .................................................. 10-319520
Nov. 25, 1998 (JP) .................................................. 10-334388
Aug. 17, 1999 (JP) .................................................. 11-230791

(51) Int. Cl.$^7$ ........................................................ F25B 1/00
(52) U.S. Cl. .......................... 62/159; 62/176.6; 62/196.4; 165/204
(58) Field of Search ............................... 62/176.1, 176.2, 62/176.6, 159, 160, 196.4; 165/202, 203, 204; 236/44 R, 44 A, 44 C, 91 R, 91 C, 91 D, 91 E

(56) References Cited

U.S. PATENT DOCUMENTS

| | | | |
|---|---|---|---|
| 4,896,589 | * | 1/1990 | Takahashi ...................... 62/176.6 X |
| 4,920,755 | * | 5/1990 | Tadahiro ........................ 62/176.6 X |
| 5,291,941 | | 3/1994 | Enomoto et al. ..................... 165/62 |
| 5,301,515 | * | 4/1994 | Iritani et al. ..................... 62/160 X |
| 6,077,158 | * | 6/2000 | Lake et al. ........................ 62/160 X |

FOREIGN PATENT DOCUMENTS

A-5-272817   10/1993   (JP) .

* cited by examiner

*Primary Examiner*—Harry B. Tanner
(74) *Attorney, Agent, or Firm*—Harness, Dickey & Pierce, PLC

(57) ABSTRACT

A vehicle air conditioner that inhibits re-evaporation of condensed water on the surface of an evaporator that might fog the inner surface of the vehicle windshield during operation of a hot gas heating cycle heating mode. It is possible to switch operation of a cooling mode by an ordinary refrigerating cycle by opening the inlet side of a condenser and closing the inlet side of a hot gas bypass passage. It is also possible to switch the operation of the heating mode by closing the inlet side of the condenser and opening the inlet side of the hot gas bypass passage. When it is determined during operation of the heating mode that the windshield will fog, operation of the air conditioning compressor is interrupted by the air conditioning control unit so that the temperature of an evaporator reaches no more than a predetermined value.

20 Claims, 16 Drawing Sheets

VEHICLE AIR CONDITIONER WITH WINDSHIELD ANTI-FOG FEATURE

CROSS-REFERENCE TO RELATED APPLICATIONS

The present application is related to, and claims priority from, Japanese Patent Application Nos. Hei. 10-319520, 10-334388 and 11-230791, the contents of which are incorporated herein by reference.

BACKGROUND OF THE INVENTION

1. Field of the Invention

The present invention relates generally to vehicle air conditioners, and more particularly to an air conditioner with an inside heat exchanger (or evaporator) that is controlled to operate either in a heating or a cooling mode, and that is controlled so that water condensed thereon is prevented from fogging the inside of a vehicle windshield at the start of the heating mode.

2. Related Art

In a conventional vehicle air conditioner, hot water (or engine cooling water) is circulated in a heating heat exchanger during cold weather so that air to be conditioned may be heated via the hot water. In this case, when the hot water temperature is low, the temperature of air to be conditioned may be insufficient for vehicle compartment heating purposes.

Japanese Patent Application Hei. 5-272817, describes a refrigerating cycle system having a hot gas heater cycle heating function. When the hot water temperature is lower than a predetermined value as at the engine starting time, the above system causes compressor discharged gas coolant (or hot gas) to be introduced into an evaporator while bypassing a condenser to release the heat from the gas coolant to the air to be conditioned in the evaporator. In the above system, more specifically, the evaporator, or a common inside heat exchanger disposed in an air conditioner duct, is selectively used as a cooler in the cooling mode and a radiator in the heating mode.

In the air conditioner discussed above, an inside air mode may be set for preventing contaminated outside air from being introduced during cold weather operation of the heating mode. In this case, it is necessary for the evaporator to both cool and dehumidify the air to be conditioned to prevent the windshield from fogging. Until the ambient air drops to 0° C., therefore, the refrigerating cycle may be operated in the cooling mode.

In the case, the temperature of the evaporator fluctuates greatly as a result of the intermittent compressor operation. Generally, when the ambient temperature drops to or below 0° C., the compressor is stopped. When a variable displacement type compressor is used, however, the evaporator temperature can be more stably controlled with less evaporator temperature fluctuation by controlling the low cycle pressure (or coolant evaporation pressure) via compressor displacement. Therefore, the compressor is operated so that the evaporator operates in a cooling/dehumidifying mode even when the ambient temperature is about −10° C.

On the other hand, the hot gas heater cycle performs an auxiliary heating function in addition to the main heating function of the hot water type heating heat exchanger and is used in an ambient temperature range as low as about +10° C.

Just after the refrigerating cycle is used at an ambient temperature of about 0° C. in the cooling mode for preventing the fogging of the windshield, therefore, the mode may be switched to the heating mode due to insufficient heating capacity at the hot water heating heat exchanger.

When the hot gas heater cycle is switched to a heating mode, however, the evaporator, having just operated in the cooling and dehumidifying modes, is changed all at once to the hot gas heating mode so that the temperature of the evaporator abruptly rises. Therefore, water that condensed on the surface of the evaporator at the time of the cooling mode evaporates again, and is carried by the conditioned air into the vehicle passenger compartment, where it causes the inside of the vehicle windshield to fog.

The condensed water once generated in the evaporator during the cooling mode operation does not easily evaporate at low ambient temperature in winter and may remain for a long time. Even just after switching from the cooling mode (that is, even if the cooling mode is not used for a long time), therefore, the vehicle windshield may fog at the start of the hot gas heater cycle heating mode.

SUMMARY OF THE INVENTION

In view of the aforementioned limitations, it is an object of the present invention to suppress vehicle windshield fogging during operation of a hot gas heater cycle heating mode.

In order to realize the above-mentioned object, the present invention provides an air conditioner for inhibiting fogging of a vehicle windshield. The air conditioner includes a refrigerating cycle including an inside heat exchanger, a compressor, an outside heat exchanger, and a first expansion valve connected in circuit. A hot gas heater cycle, which bypasses the above outside heat exchanger, includes the inside heat exchanger, the compressor, and a second expansion valve connected in circuit. An air conditioner duct in which the inside heat exchanger is disposed for conditioning air blown therethrough.

The air conditioner also includes a controller for determining whether the windshield will fog, and for limiting operation of the hot gas heater cycle when it is determined that the windshield will fog. The controller may perform such operations based on one of several different parameters, including engine cooling water temperature, outside air temperature, both engine cooling water temperature and outside air temperature, or mapped values correlating engine cooling water temperature and outside air temperature.

DESCRIPTION OF THE PREFERRED EMBODIMENTS

The invention will be described in connection with its embodiments with reference to the accompanying drawings.
[First Embodiment]

Figure 1:
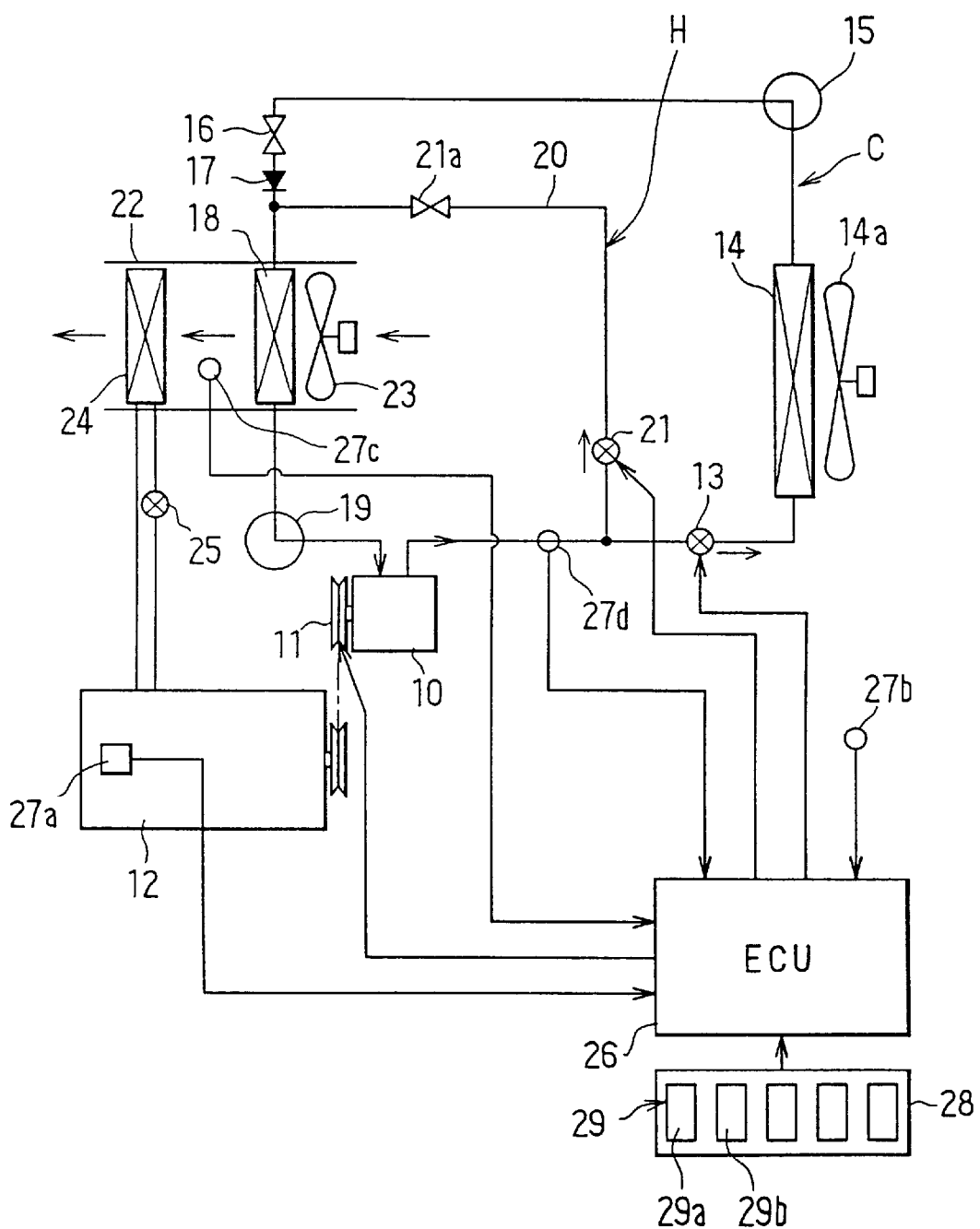
FIG. 1 is a system diagram of a first embodiment of the present invention.

FIG. 1 shows the first embodiment of the present invention in applied to a refrigerating cycle system in a vehicle air conditioner. A compressor 10, which is a fixed displacement type swash plate compressor, for example, is driven through an electromagnetic clutch 11 by a water-cooled engine 12.

The discharge side of the compressor 10 is connected through a cooling first solenoid valve 13 to a condenser 14, the outlet side of which is connected to a receiver 15 for reserving a liquid coolant by separating the gas and liquid in a coolant. The condenser 14 is an outside heat exchanger which is arranged together with the compressor 10 or the like in a vehicle engine room for performing heat exchange with the outside air (or cooling air) blown by an electric cooling fan 14a.

Moreover, the outlet side of the receiver 15 is connected to a thermal expansion valve. The outlet side of this thermal expansion valve 16 is connected through a check valve 17 to an evaporator 18. The outlet side of the evaporator 18 is connected through an accumulator 19 to the suction side of the compressor 10.

An ordinary cooling refrigerating cycle C is constructed of a closed circuit from the discharge side of the compressor 10 to the suction side of the compressor 10 through the first solenoid valve 13→the condenser 14→the receiver 15→the thermal expansion valve 16→the check valve 17→the evaporator 18→the accumulator 19.

The thermal expansion valve 16, as is well known in the art, regulates its valve opening (or coolant flow rate) so that the degree of superheat of the outlet coolant of the evaporator 18 may be kept at a predetermined value in an ordinary refrigerating cycle operation (or in a cooling mode). The accumulator 19 reserves a liquid coolant by separating the gas and liquid of the coolant and causes the gas coolant and a small quantity of liquid coolant (in which the oil dissolves) in the vicinity of the bottom to be sucked into the compressor 10.

Between the discharge side of the compressor 10 and the inlet side of the evaporator 18, on the other hand, is disposed a hot gas bypass passage 20 which bypasses the condenser 14 and so on and in which a heating second solenoid valve 21 and a throttle 21a are disposed in series. The throttle 21a can be constructed of a fixed throttle such as an orifice or capillary tube. A heating hot gas heater cycle H is constructed of a closed circuit from the discharge side of the compressor 10 to the suction side of the compressor 10 through the second solenoid valve 21→the throttle 21a→the evaporator 18→the accumulator 19.

An air conditioner duct 22 defines an air passage for the air to flow into a vehicle compartment so that the air (or the inside air or the outside air) is blown in the air conditioner duct 22 by a blower 23. The evaporator 18 is an inside heat exchanger which is disposed in the air conditioner duct 22 so that the coolant is circulated in the cooling mode by the refrigerating cycle C to cool the air blown by the blower 23 through the coolant evaporation in the evaporator 18. In the heating mode, on the other hand, the evaporator 18 functions as a radiator and causes a hot coolant gas from the hot gas bypass passage 20 to flow in to heat the blown air.

In the air conditioner duct 22, there is disposed at the downstream side of the air flow of the evaporator 18 a hot water type heating heat exchanger 24 for heating the blown air by using hot engine cooling water from the vehicle engine 12 as a heat source. As a result, the conditioned air is blown into the compartment from the (not-shown) exit which is disposed at the downstream side of the heating heat exchanger 24. A hot water circuit to the heating heat exchanger 24 is provided with a hot water valve 25 for controlling the flow of the hot water.

An air conditioning electronic control unit ("ECU") 26 is constructed of a microcomputer and its peripheral circuits, and processes input signals in accordance with preset programs to open/close the first and second solenoid valves 13, 21 and to control the actions of the remaining electronic devices (11, 14a, 23, 25 and so on).

Detection signals are input to the ECU from a set of sensors including a water temperature sensor 27a, an outside temperature sensor 27b, an evaporator blow temperature sensor 27c acting as a temperature detector of the evaporator 18, and a pressure sensor 27d of the compressor discharge pressure.

Also, control signals are input from a control switch train 29 of an air conditioning control panel 28 which is disposed in the vicinity of a dashboard in the vehicle compartment. This control switch train 29 includes an air conditioner switch 29a for commanding start/stop of the compressor 10 in the refrigerating cycle, and a heater switch 29b for setting the heating mode in the hot gas heater cycle. The air conditioner switch 29a functions as a cooling switch for setting the cooling mode.

Operation of the above embodiment will now be described. First, operation of the refrigerating cycle portion will be described. In the cooling mode, the first solenoid valve 13 is opened whereas the second solenoid valve 21 is closed by the ECU 26. As a result, the electromagnetic clutch 11 is applied so that the compressor 10 is driven by the engine 12. Then, the discharge gas coolant of the compressor 10 flows through the first solenoid valve 13, which is in the open state, into the condenser 14.

In the condenser 14, the coolant is cooled and condensed by the outside air which is blown by the cooling fan 14a.

Then, the coolant having passed through the condenser 14 is separated by the receiver 15 into gas and liquid coolants, of which the liquid coolant is exclusively reduced in pressure by the thermal expansion valve 16 to establish a gas-liquid two-phase state at low temperature and under low pressure.

Next, the low-pressure coolant passes through the check valve 17 and flows into the evaporator 18 so that it evaporates while absorbing heat from the conditioned air blown by the blower 23. The conditioned air thus cooled in the evaporator 18 flows into the vehicle compartment to cool the compartment. The gas coolant evaporated in the evaporator 18 is sucked through the accumulator 19 and compressed by the compressor 10.

When the heating mode operates during cold outside temperatures, the first solenoid valve 13 is closed whereas the second solenoid valve 21 is opened by the ECU 26 so that the hot gas bypass passage 20 is opened. As a result, the discharged hot gas coolant (or the superheated gas coolant) of the compressor 10 passes through the second solenoid valve 21 in the open state and is reduced in pressure by the throttle 21*a* until it flows into the evaporator 18.

At this time, the check valve 17 prevents the gas coolant from flowing from the hot gas bypass passage 20 to the thermal expansion valve 16. As a result, the refrigerating cycle is run by the closed circuit (or the hot gas heater cycle H) of the discharge side of the compressor 10→the second solenoid valve 21→the throttle 21*a*→the evaporator 18→the accumulator 19→the suction side of the compressor 10.

Moreover, the superheated gas coolant having been reduced in pressure by the throttle 21*a* heats the blown air by releasing the heat to the blown air in the evaporator 18. Here, the calories to be released from the gas coolant in the evaporator 18 corresponds to the compression workload of the compressor 10. At this time, if the temperature of the hot water of the engine 12 has risen to a predetermined degree, the blown air can be further heated by the hot water type heating heat exchanger 24 by supplying the heat exchanger 24 with the hot water through the hot water valve 25. As a result, warm air can be blown into the vehicle compartment. The gas coolant having released its heat in the evaporator 18 is sucked and compressed through the accumulator 19 by the compressor 10.

Figure 2:
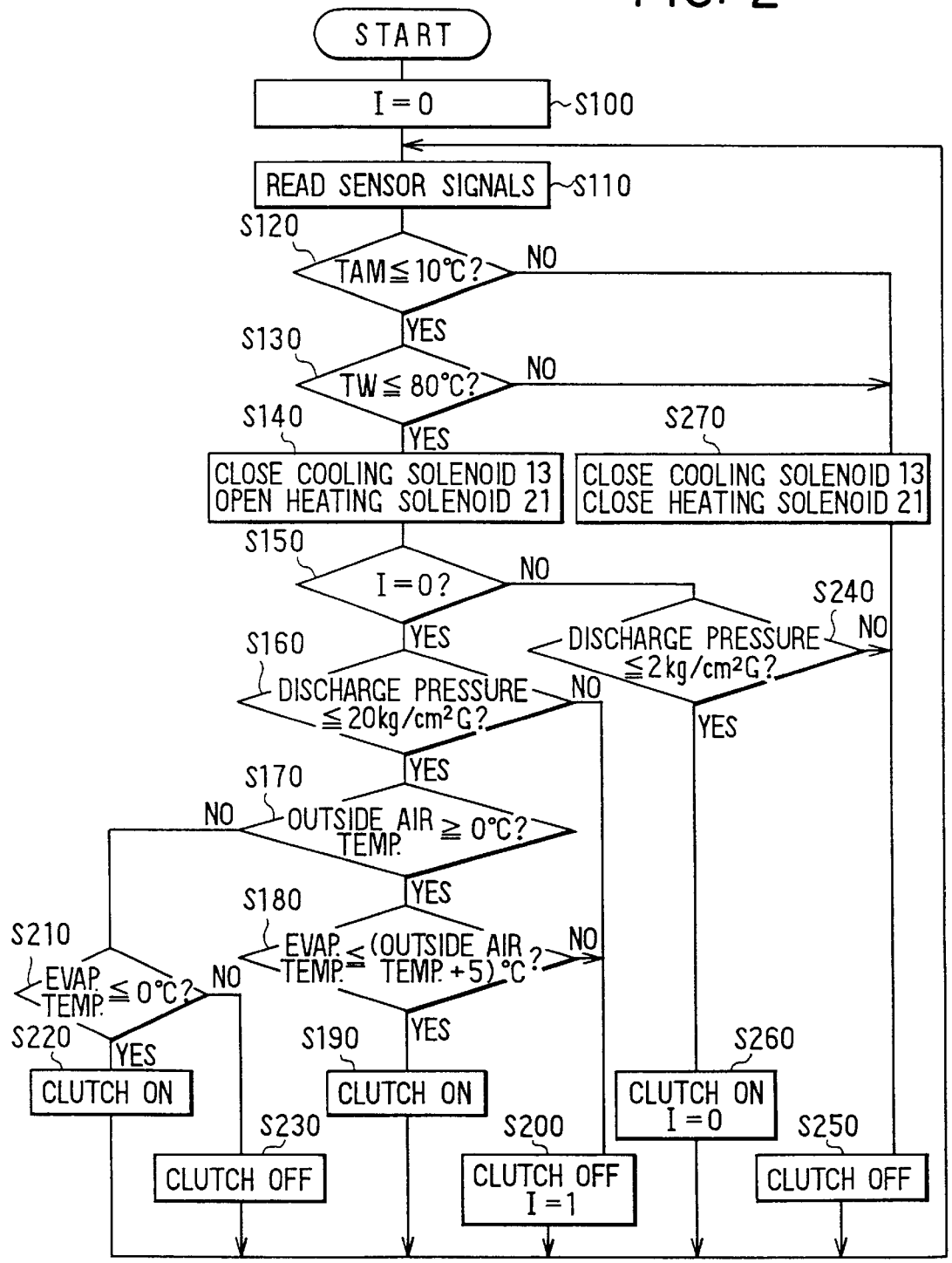
FIG. 2 is a flow diagram showing heating mode control of the first embodiment.

Next, evaporator temperature control via a fixed displacement type swash plate compressor for preventing the windshield from fogging, as required by switching the cooling mode and the heating mode at a low ambient temperature in winter, will be described. The control routines of FIG. 2 are started, for example, by turning ON the (not-shown) ignition switch of the vehicle engine 12 and by turning ON the heating switch 29*b* of the control switch train 29 on the air conditioner. At Step S100, a flag is initialized to I=0. At Step S110, the signals are read from the individual sensors 27*a*–27*d* and the control switch train 29 of the air conditioner control panel 28.

At Step S120, it is determined whether the ambient air temperature is no more than a first predetermined value (e.g., 10° C.). When the ambient temperature is no more than the first predetermined value, it is determined at Step S130 whether the engine water temperature is no more than a predetermined value (e.g., 80° C.).

When the engine water temperature is no more than the predetermined value, at Step S140, the cooling first solenoid valve 13 is closed whereas the heating second solenoid valve 21 is opened (to initiate the heating mode). At Step S150, it is determined whether or not the flag I=0. If the decision is the first one after the heating switch 29*b* was turned ON, the flag I=0, and the routines advance to Step S160, where it is determined whether the discharge pressure Pd of the compressor 10 is no more than a first predetermined value (e.g., 20 Kg/cm$^2$G).

If the discharge pressure Pd is no more than the first predetermined value, the routines advance to Step S170, where it is determined whether the ambient temperature is no less than a second predetermined value (e.g., 0° C.). If the ambient temperature is no less than the second predetermined value, it is determined at Step S180 whether or not an evaporator temperature (i.e., the evaporator blow temperature) Te is lower than a first predetermined value. Here, this first predetermined value is set, for example, to the ambient temperature +5° C.

When the evaporator temperature Te is lower than the first predetermined value, moreover, the routine advances to Step S190, at which the electromagnetic clutch 11 is turned ON to activate the compressor 10. When the evaporator temperature Te is higher than the first predetermined value, on the contrary, the routine advances to Step S200, at which the electromagnetic clutch 11 is turned OFF to stop the compressor 10, and the flag is set to I=1.

When the ambient temperature is lower at Step S170 than the second predetermined value, on the other hand, the routine advances to Step S210, at which it is determined whether or not the evaporator temperature Te is lower than the second predetermined value. In this embodiment, the second predetermined value is set to 0° C. When the evaporator temperature is lower than the second predetermined value, moreover, the routine advances to Step S220, at which the electromagnetic clutch 11 is turned ON to activate the compressor 10. When the evaporator temperature Te is higher than the second predetermined value, the routine advances to Step S230, and the electromagnetic clutch 11 is turned OFF to stop the compressor 10.

When the discharge pressure Pd of the compressor 10 is higher at the aforementioned Step S160 than the first predetermined value, on the other hand, the routine advances to Step S200, and the electromagnetic clutch 11 is turned OFF to stop the compressor 10 and to set the flag I=1.

In the presently-described embodiment, the capacity of the hot gas cycle heating mode is controlled by interrupting the compressor 10 based on the discharge pressure Pd of the compressor 10. When the discharge pressure Pd of the compressor 10 exceeds the first predetermined value, therefore, the compressor 10 is stopped to limit the heating capacity and to prevent an abnormal rise in the cycle high pressure.

Since the flag I=1 at Step S200, moreover, the decision at Step S150 is NO, and the routine advances to Step S240, where it is determined whether the discharge pressure Pd of the compressor 10 is no more than a second predetermined value (e.g., 2 Kg/cm$^2$G). Until the discharge pressure Pd of the compressor 10 drops to or below the second predetermined value, the routine advances from Step S240 to Step S250, and the OFF state of the electromagnetic clutch 11 (or the stop state of the compressor 10) is maintained.

When the discharge pressure Pd is lowered to or below the second predetermined value by stopping the compressor 10, moreover, the routine advances from Step S240 to Step S260, and the electromagnetic clutch 11 is turned ON to return the compressor 10 to the active state and to set the flag I=0. As a result, the routine advances from Step S150 to Step S160, and the active state of the compressor 10 is maintained until the discharge pressure Pd exceeds the first predetermined value.

Here, when it is determined at Step S120 that the ambient temperature exceeds 10° C. and when it is determined at Step S120 that the engine water temperature exceeds 80° C., the heating mode by the hot gas heater cycle is not required, the routine advances to Step S270, and both the cooling first solenoid valve 13 and the heating second solenoid valve 21 are closed. Then, at Step S250, the electromagnetic clutch 11 is turned OFF to stop the compressor 10.

In the hot gas heater cycle heating mode, the ambient temperature is in a range as low as or lower than 10° C. so that the discharge pressure Pd abruptly drops with the stop of the compressor 10. Therefore, a large pressure difference (or hysteresis) is set between the first predetermined value (e.g., 20 Kg/cm²G) of the discharge pressure Pd for stopping the compressor and the second predetermined value (e.g., 2 Kg/cm²G) for restoring the action of the compressor thereby to suppress the frequent interruption (or hunting) of the compressor 10.

In the heating mode, the action of the compressor 10 is thus controlled to control the evaporator temperature, as will be summarized in the following.

$$0° C. \leq \text{Ambient Temperature} \leq 10° C. \tag{1}$$

At this time, the action of the compressor 10 is so controlled at Steps S180, S190 and S200 so that the evaporator temperature may be at the ambient temperature +5° C. As a result, it is possible for the following reasons to prevent the windshield from fogging.

At a heating time in winter, more specifically, the outside air is usually introduced into the air conditioner duct 22 to prevent the windshield from fogging, so that the outside air passes through the evaporator 18. By controlling the temperature of the evaporator 18 to no more than a value (e.g., the ambient temperature +5° C.) slightly higher than the ambient temperature, the introduced outside air is heated to a slightly higher temperature (i.e., +5° C.) by the evaporator 18 so that the drop in the relative humidity of the outside air introduced is small. This makes it possible to suppress the condensed water from being evaporated again in the evaporator 18.

Since the vehicle windshield has direct contact with the outside air, moreover, its temperature is equal to or slightly higher than the ambient temperature. If the temperature of the evaporator 18 is controlled to a value (i.e., the ambient temperature +5° C.) slightly higher than the ambient temperature, therefore, the air having been blown toward the vehicle windshield from the (not-shown) defroster blow port provided downstream from the heating heat exchanger 24 will neither reach its saturated state nor condense on the surface of the windshield, even if it contacts the windshield and is cooled to a temperature as low as that of the vehicle windshield.

When the heating mode is to be executed by introducing the outside air into the air conditioner duct 22, the temperature of the evaporator 18 is controlled to the ambient temperature +5° C. as the ambient temperature rises to 0° C. or higher, so that the heating load on the heating heat exchanger 24 can be lessened by the temperature rise of +5° C., thereby improving heating of the compartment.

$$\text{Ambient Temperature} \leq 0° C. \tag{2}$$

At this time, the action of the compressor 10 is controlled by Steps S210, S220 and S230 so that the evaporator temperature may be at 0° C. As a result, the condensed water frozen in the evaporator 18 can be prevented from melting and evaporating to prevent fogging of the windshield, as might otherwise be caused by the evaporation of the condensed water.

In extremely cold conditions, such as when the ambient temperature=−30 to −20° C., the hot gas heater cycle heating mode raises the temperature of the outside air introduced into the air conditioner duct 22 from −30 to −20° C. to 0° C. by the release of heat from the gas coolant in the evaporator 18. As a result, the compartment is more quickly, and more effectively, heated.

[Second Embodiment]

Figure 3:
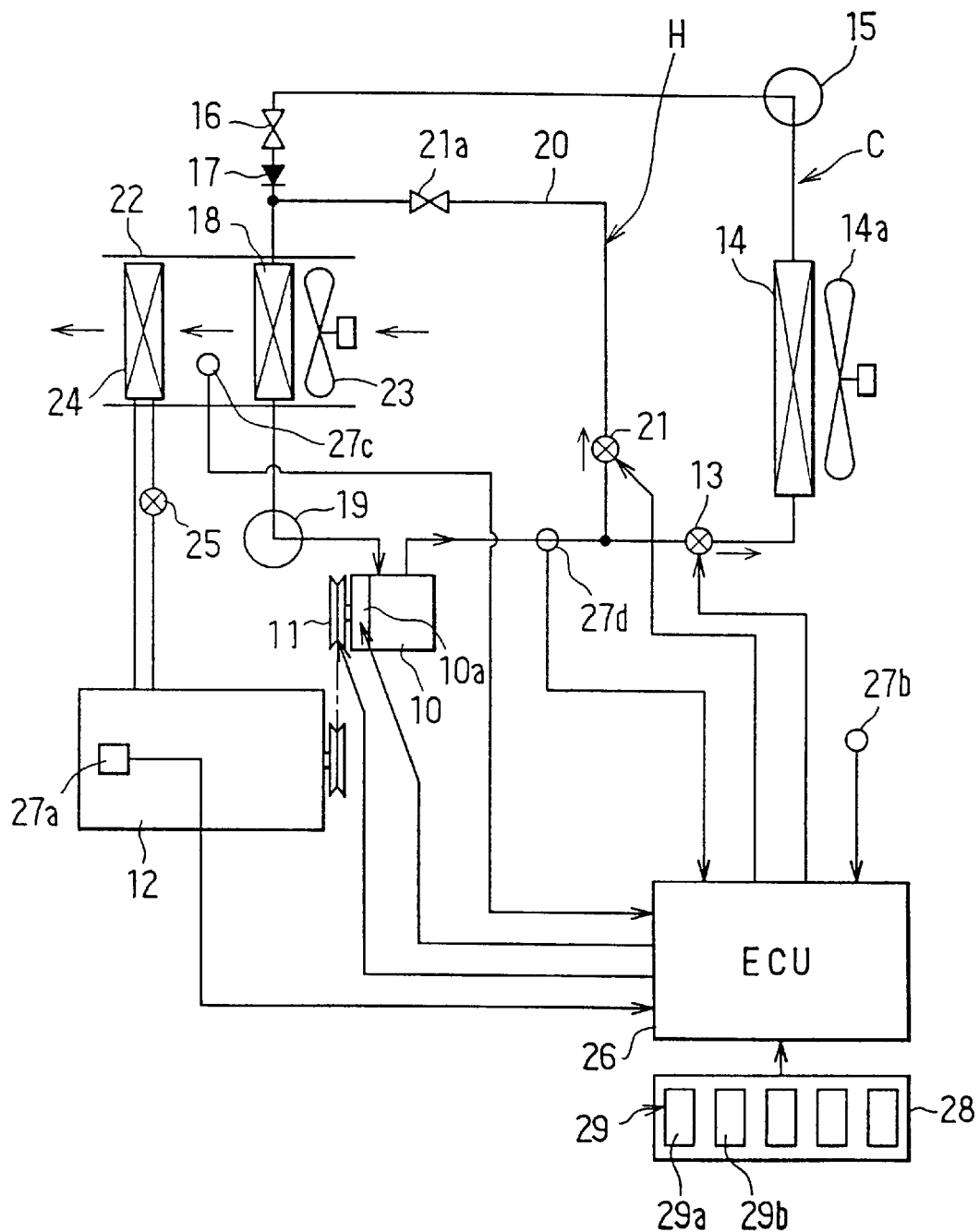
FIG. 3 is a system diagram of a second embodiment of the present invention.
Figure 4:
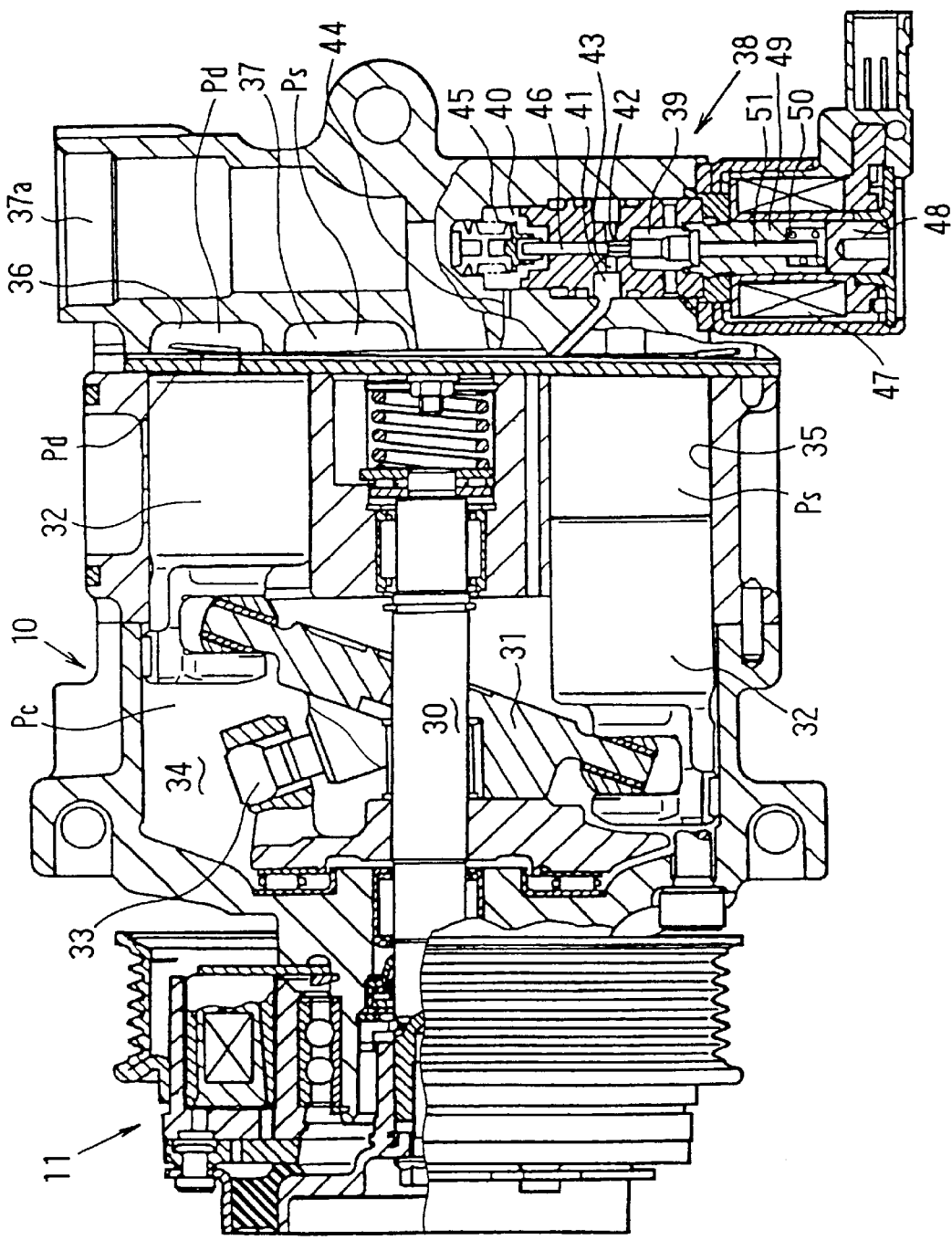
FIG. 4 is a longitudinal section of a variable displacement compressor to be used in the second embodiment.
Figure 5:
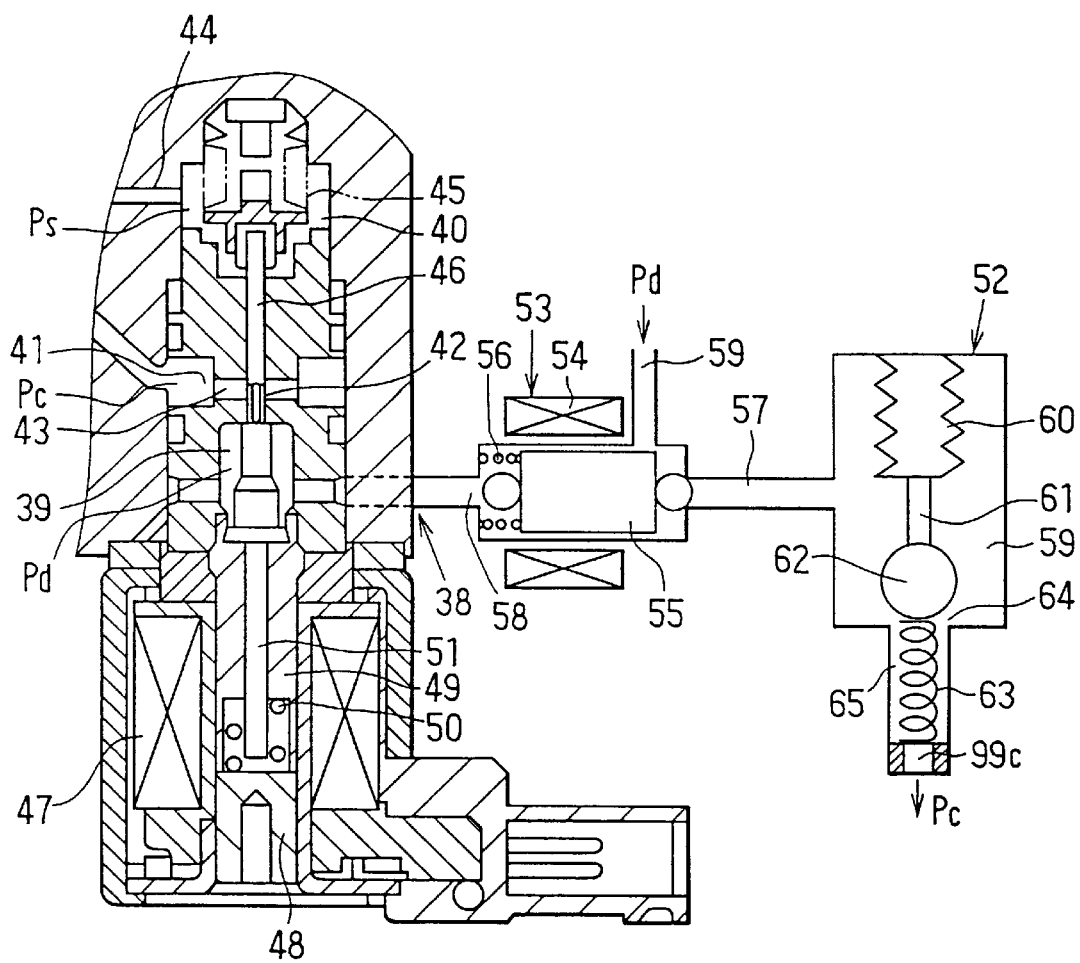
FIG. 5 is a section of a main portion of a displacement varying mechanism of the variable displacement compressor of FIG. 4.

In the first embodiment, the discharge pressure Pd of the compressor 10 is controlled within a predetermined range to control the heating capacity by using a fixed displacement type compressor 10 to control the action of the compressor 10 based on control Steps S160 and S240 of FIG. 2. In the second embodiment, however, the compressor 10 is a variable displacement type equipped with a variable displacement mechanism 10a for varying the discharge displacement, as shown in FIGS. 3 to 5. Therefore, the heating capacity may be controlled by controlling the discharge displacement of the compressor 10 to control the discharge pressure Pd of the compressor 10 within a predetermined range.

FIG. 4 shows one example of the specific structure of the variable displacement type compressor 10 in the second embodiment, the summary of which will be described in the following. This compressor 10 is a wobble type variable displacement compressor, the shaft 30 of which is rotated when the power of the engine 12 is transmitted thereto through the electromagnetic clutch 11. A swash plate 31 is connected to the shaft 30 to rotate together therewith, and a piston 32 axially reciprocates as the swash plate 31 rotates.

In accordance with the change in the angle of inclination of the swash plate 31, moreover, the stroke of the piston 32 can be changed to vary the displacement (i.e., the discharge displacement) of the compressor 10. For this operation, the swash plate 31 is supported by a spherical support 33 to enable the swash plate to rock. The angle of inclination of the swash plate 31 is changed by the balance between the pressure in a crank chamber 34 acting on the back of the piston 32, or a control pressure Pc and a pressure in a cylinder 35 in which the piston 32 reciprocates. By adjusting the control pressure Pc in the crank chamber 34, therefore, the angle of inclination of the swash plate 31 can be changed.

The gas coolant compressed by the cylinder 35 of the compressor 10 is discharged to a discharge chamber 36, from which it is further discharged through the (not-shown) discharge port to the upstream side of the solenoid valves 13 and 21 of FIG. 3. The coolant is sucked through a suction chamber 37 by the cylinder 35 of the compressor 10. The suction chamber 37 communicates with the outlet side of the accumulator 19 of FIG. 3 through a suction port 37a.

Moreover, the pressure Pc of the crank chamber 34 is changed by an electromagnetic pressure controller 38 for the cooling mode and a pressure controller 52 (of FIG. 5) for the heating mode by making use of both the coolant discharge pressure Pd of the discharge chamber 36 and the coolant suction pressure Ps of the suction chamber 27.

The electromagnetic pressure controller 38 for the cooling mode is provided with a discharge pressure chamber 39 communicating with the discharge chamber 36, a suction pressure chamber 40 communicating with the suction chamber 37, and a control pressure chamber 41 communicating with the crank chamber 34. Moreover, the discharge pressure chamber 39 communicates with the control pressure chamber 41 through a variable throttle 43 having an opening adjusted by a valve member 42. In this embodiment, the valve member 42 and the variable throttle 43 together form variable throttle mechanism. The suction pressure chamber 40 communicates with the control pressure chamber 41 through a fixed throttle 44.

In the suction pressure chamber 40, there is arranged a bellows (a pressure responding mechanism) 45 made of an extendible material and the inside of which is preset at a predetermined internal pressure $Pb_1$, so that it extends/contracts as the suction pressure Ps changes with respect to that internal pressure $Pb_1$. By the extension/contraction of the bellows 45, the valve member 42 is displaced through a rod 46. The electromagnetic force of the electromagnetic mechanism is also applied to the bellows 45 and the valve member 42.

Specifically, the electromagnetic mechanism of this embodiment is constructed to include: a solenoid coil 47; a stationary pole member 48; a movable pole member (or plunger) 49 attracted toward the stationary pole member 48 (or in a direction that causes the bellows 45 to extend) by the electromagnetic force of the solenoid coil 47; and a coil spring 50 for applying its spring force to the movable pole member 49. A rod 51 is connected to the center portion of the movable pole member 49, and is jointed together with the valve member 42 and the rod 46 so that the configuration moves together.

A control current is applied from the ECU 26 to the solenoid coil 47 of the electromagnetic mechanism thus constructed, and the electromagnetic force to be applied to the movable pole member 49 is varied with the variation in control current so that the set level of the suction pressure varies. In short, the set level of the suction pressure rises as the control current increases.

When the suction pressure Ps is raised by the increase in the cooling load in the cooling mode, moreover, the control pressure Pc in the control pressure chamber 41 is lowered to lower the pressure in the crank chamber 34. As a result, the back pressure of the piston 32 is lowered so that the swash plate 31 is inclined to increase the angle of inclination θ of the swash plate 31. As a result, the stroke of the piston 32 is elongated to increase the displacement of the compressor 10. Thus, the flow rate of the cycling coolant increases to augment the cooling capacity so that the suction pressure Ps gradually decreases.

When the suction pressure Ps drops, the control pressure Pc of the control pressure chamber 41 is increased to increase the pressure in the crank chamber 34. Then, the swash plate 31 stands up to reduce its angle of inclination θ so that the stroke of the piston 32 is shortened to decrease the displacement of the compressor 10. As a result, the flow rate of the cycling coolant decreases to reduce the cooling capacity so that the suction pressure Ps gradually increases.

Figure 6A:
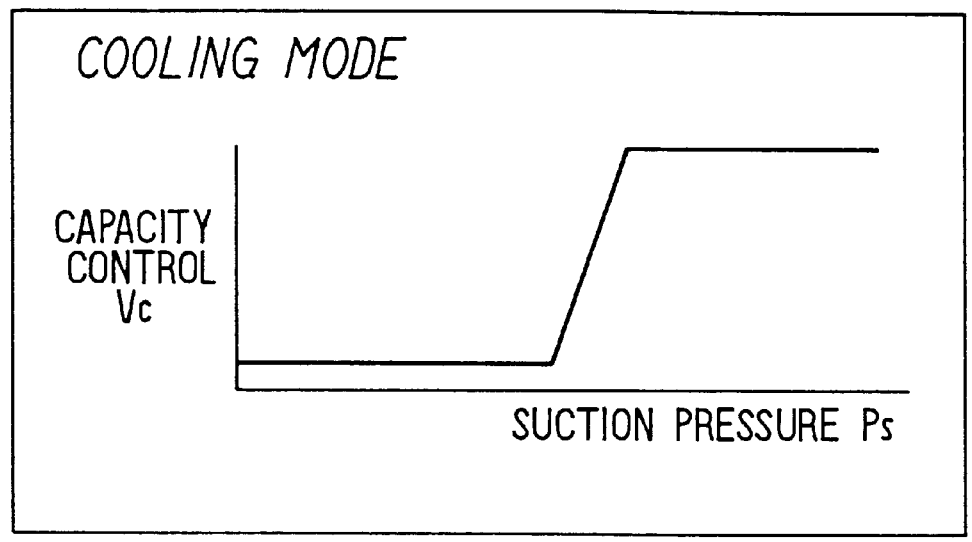
FIGS. 6A and 6B are diagrams illustrating displacement varying characteristics of the variable displacement compressor of FIG. 4.

By thus controlling the displacement of the compressor 10, the suction pressure Ps can be controlled to control the temperature of the evaporator 18 (i.e., the blown air temperature). FIG. 6A illustrates the capacity control of the compressor 10 and the suction pressure Ps in the cooling mode.

If the set level of the suction pressure Ps is adjusted by adjusting the control current of the solenoid coil 47, on the other hand, it is possible to adjust the blown air temperature of the evaporator.

In FIG. 5, reference numeral 53 designates a solenoid selector valve for selecting the feed of the discharge pressure Pd to the electromagnetic pressure controller 38 for the cooling mode and the pressure controller 52 for the heating mode. FIG. 5 shows the state in which the solenoid selector valve 53 is in the cooling mode so that a valve member 55 is pushed rightwardly in the drawing by the force of spring 56, when a solenoid coil 54 is de-energized, to close one communication passage 57 and open the other communication passage 58.

As a result, an introduction passage 59 for the discharge pressure Pd communicates through the communication passage 58 with the discharge pressure chamber 39 of the electromagnetic pressure controller 38 for the cooling mode. Discharge pressure is therefore applied to the discharge pressure chamber 39 so that the compressor displacement in the aforementioned cooling mode can be controlled.

In the heating mode, on the other hand, the solenoid coil 54 of the solenoid selector valve 53 is energized by the ECU 26 so that the valve member 55 is moved leftwardly in the drawing, against the force of the spring 56 by the electromagnetic force of the solenoid coil 54, to open one communication passage 57 and close the other communication passage 58.

As a result, the introduction passage 59 for the discharge pressure Pd communicates through the communication passage 57 with the discharge pressure chamber 59 of the pressure controller 52 for the heating mode to apply the discharge pressure Pd to the discharge pressure chamber 59. In this discharge pressure chamber 59, there is arranged a bellows (or a pressure responding mechanism) 60 which is made of an extendible material and the inside of which is preset at a predetermined internal pressure $Pb_2$, to extend/contract as the discharge pressure Pd changes with respect to the internal pressure $Pb_2$.

In accordance with the extension/contraction of the bellows 60, a valve member 62 is displaced through a rod 61. The force of a spring 63 is also applied to that valve member 62. This spring 63 is a return spring for determining the initial positions of the bellows 60 and the valve member 62.

In accordance with the displacement of the valve member 62, the opening of a throttle portion 64 is varied to adjust the control pressure Pc of a control pressure chamber 65 at the downstream side of the throttle portion 64. Like the control pressure chamber 41 in the electromagnetic pressure controller 38 for the cooling mode, the control pressure chamber 65 communicates not only with the crank chamber 34 but also with the suction pressure chamber 40 through the fixed throttle 44.

Next, operation of the pressure controller 52 for the heating mode will be described. When the discharge pressure Pd to be applied to the discharge pressure chamber 59 becomes lower than a first predetermined value (e.g., 20 $Kg/cm^2G$), the bellows 60 extends so that the valve member 62 closes the throttle portion 64. As a result, the control pressure Pc in the control pressure chamber 65 is lowered to the suction pressure Ps so that the pressure in the crank chamber 34 becomes equal to the suction pressure Ps thereby to maximize the displacement of the compressor (to 100%).

When the discharge pressure Pd exceeds a second predetermined value (e.g., 22 $Kg/cm^2G$), on the contrary, the bellows 60 contracts so that the valve member 62 opens the throttle portion 64 with the maximum opening. As a result, the control pressure Pc of the control pressure chamber 65 rises to the discharge pressure Pd so that the pressure in the crank chamber 34 becomes equal to the discharge pressure Pd to minimize the displacement of the compressor (to 5%).

Figure 6B:
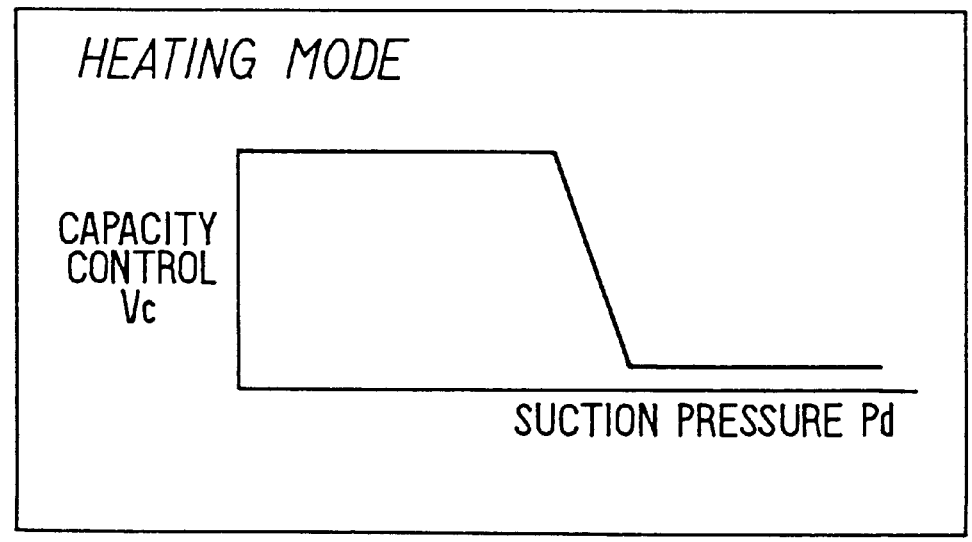

When the discharge pressure Pd is between the aforementioned first and second values, moreover, the displacement of the compressor 10 is adjusted to continuously decrease by enlarging the opening of the throttle portion 64 with the displacement of the valve member 62 as the discharge pressure Pd rises. FIG. 6B illustrates a relation between the displacement control of the compressor 10 and the discharge pressure Pd in the heating mode.

Here, the variable displacement mechanism 10a of FIG. 3 is constructed, as understood from the description thus far made, in this embodiment by combining the swash plate 31, the electromagnetic pressure controller 38 for the cooling mode, the pressure controller 52 for the heating mode and the solenoid selector valve 53.

Figure 7:
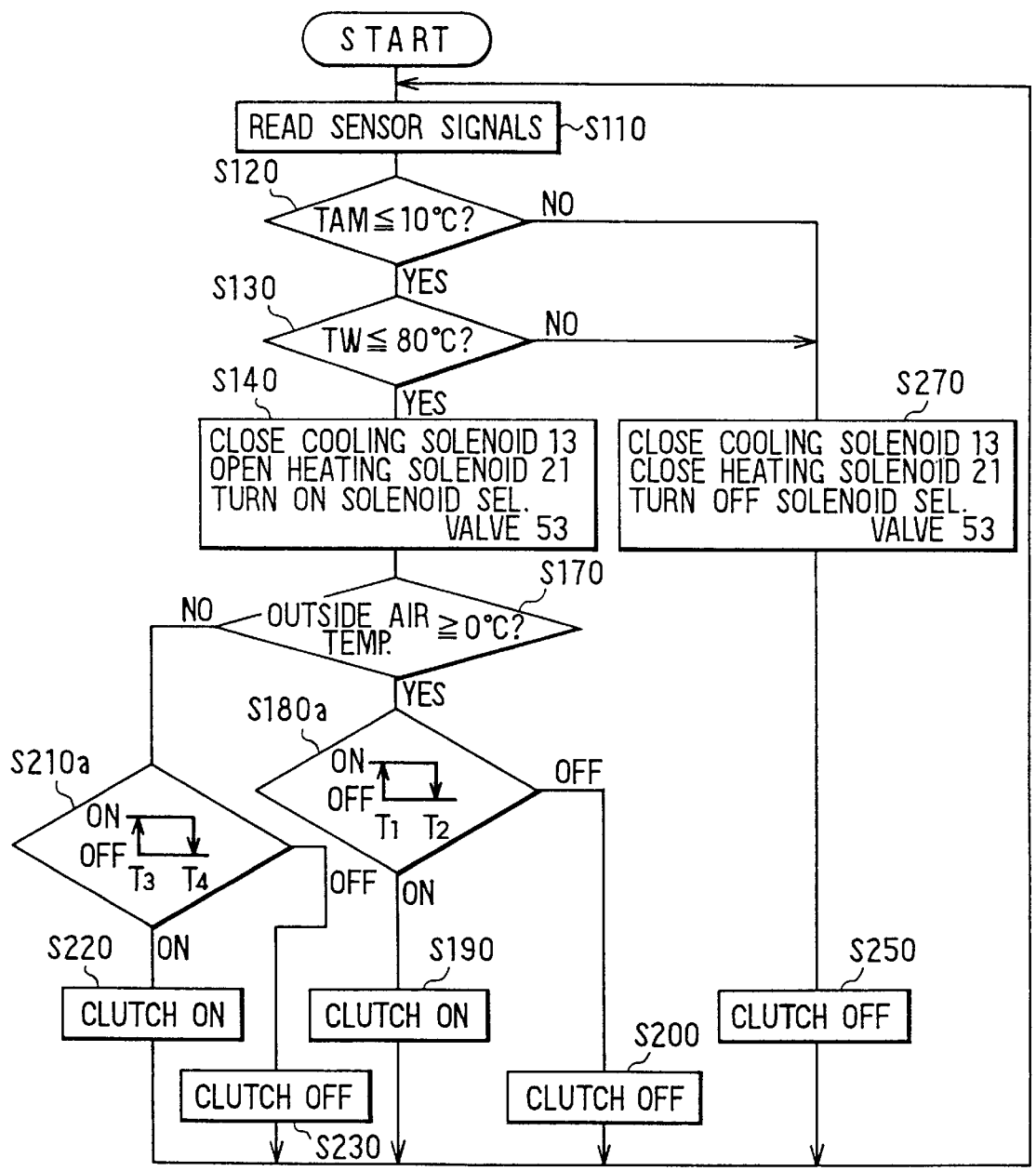
FIG. 7 is a flow diagram showing control in a heating mode by the second embodiment.

FIG. 7 is a flow diagram corresponding to that of FIG. 2 and shows an example of the control of the evaporator temperature in the heating mode in the refrigerating cycle with the aforementioned variable displacement type compressor 10. In this second embodiment, the discharge pressure Pd in the heating mode can be controlled by controlling the displacement of the compressor 10, as has already been described, to eliminate the interrupted control of the electromagnetic clutch 11 (or the compressor 10) responding to the discharge pressure Pd at Steps S160, S200, S240 and S260 of FIG. 2.

In FIG. 7, what is different from the control of FIG. 2 is the interrupted control of the electromagnetic clutch 11 (i.e., the compressor 10) at Step S180a (corresponding to Step S180 of FIG. 2) and Step S210a (corresponding to Step S210 of FIG. 2), as will now be described. When it is determined at Step S170 that the ambient temperature is no less than 0° C., it is determined at Step S180a which of first or second set temperature T1 or T2, set based on the ambient temperature and the actual evaporator temperature (or the blown temperature of the evaporator), is higher.

Specifically, the first set temperature T1=the ambient temperature +3° C., and the second set temperature T2=the ambient temperature +5° C., so that the first and second set temperatures T1 and T2 are related to add the small predetermined values to the ambient temperature.

When the actual evaporator temperature exceeds the second set temperature T2, moreover, the decision OFF is made at Step S180a, and the routine advances to Step S200, and the electromagnetic clutch 11 is turned OFF to stop the compressor 10.

When the evaporator temperature is lowered by this stop of the compressor 10 below that of the first set temperature T1, the decision ON is made at Step S180a, and the routine advances to Step S190, at which the electromagnetic clutch 11 is turned ON to activate the compressor 10.

By thus interrupting the action of the compressor 10, the evaporator temperature can be kept between the aforementioned first and second set temperatures T1 and T2.

When it is determined at Step S170 that the ambient temperature is lower than 0° C., on the other hand, the routine advances to Step S210a, and it is determined which of third and fourth set temperatures T3 or T4, set based on the ambient temperature and the actual evaporator temperature (or the blown temperature of the evaporator), is higher.

Specifically, the third set temperature T3=the ambient temperature −2° C., and the fourth set temperature T4=the ambient temperature 0° C., so that both the third and fourth set temperatures T3 and T4 take values no more than 0° C.

When the actual evaporator temperature exceeds the fourth set temperature T4, moreover, the decision OFF is made at Step S210a, and the routine advances to Step S230, at which the electromagnetic clutch 11 is turned OFF to stop the compressor 10.

When the evaporator temperature is lowered by this stop of the compressor 10 below the third set temperature T3, the decision ON is made at Step S210a, and the routine advances to Step S220, where the electromagnetic clutch 11 is turned ON to activate the compressor 10.

By thus interrupting the action of the compressor 10, the evaporator temperature can be kept between the aforementioned third and fourth set temperatures T3 and T4 and at a temperature of no more than 0° C. In this second embodiment, too, the windshield can be prevented from fogging as in the first embodiment by controlling the evaporator temperature in the heating mode.

Here, the temperature difference between the first and second set temperatures T1 and T2 and the temperature difference between the third and fourth set temperatures T3 and T3 prevent frequent interruptions of the compressor 10. In place of providing such hysteresis, in response to the ON signal or OFF signal of the electromagnetic clutch 11, the electromagnetic clutch may be kept in the ON state or OFF state for a predetermined time period by a timer and may then be returned to the OFF state or ON state.

Since the variable displacement compressor 10 is used in the second embodiment, on the other hand, when the hot gas heater cycle heating mode is to be set at Step S140, the solenoid selector valve 53 is turned ON to establish the state in which the displacement control of the compressor 10 is made by the pressure controller 52 for the heating mode. When the heating mode by the hot gas heater cycle is to be stopped at Step S270, on the other hand, the solenoid selector valve 53 is turned OFF to establish the state in which the displacement control of the compressor 10 is made by the pressure controller 38 for the cooling mode.

[Third Embodiment]

The foregoing first and second embodiments prevent a windshield from fogging by controlling the action of the compressor 10 so that the temperature of the evaporator 18 is always no more than a predetermined level in the hot gas heater cycle heating mode. Since the control of the evaporator temperature is always made, on the contrary, the hot gas heating operation is restricted under the condition of no fogging of the windshield. Therefore, maximum performance of the hot gas heating cannot be exhibited.

Specifically, the evaporator 18 is not always covered with condensed water, such as when the cooling operation is not performed for a long time. Even if the evaporator 18 is covered with condensed water, the windshield will not fog when its temperature is high, for example. Under such a condition, it is preferable to make no restriction on the hot gas heating operation to improve heating performance.

In view of this point, according to the third embodiment, a device for determining whether or not the windshield will fog at the time of the hot gas heating operation is provided. The evaporator temperature is controlled only when the device determines that windshield fogging may occur, i.e., when the temperature of the evaporator 18 may be less than or equal to a predetermined level. When it is determined that windshield fogging will not occur, the evaporator temperature (i.e., restriction on the hot gas heating operation) is not limited.

Figure 8:
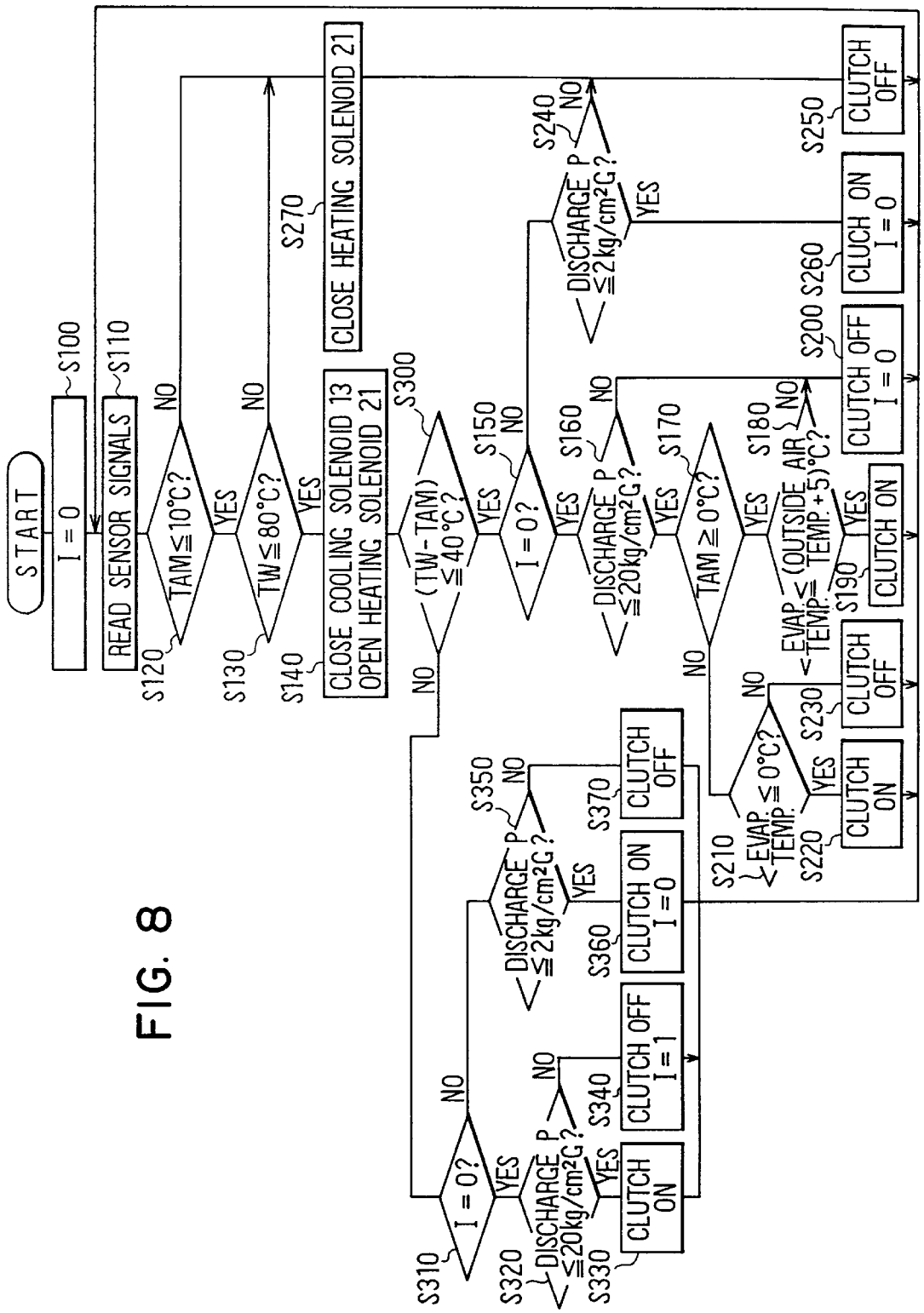
FIG. 8 is a flow diagram showing control in a heating mode by a third embodiment.

FIG. 8 is a flow diagram showing control of a fixed displacement type compressor 10 according to the third embodiment, and corresponds to FIG. 2. The description of the common steps will be omitted by designating them with the common numerals. In FIG. 8, Step S140 of executing the hot gas heating operation is accompanied by Step S300 of including the fogging determining device.

As the temperature of the windshield decreases, the absolute humidity for the inside air to reach the freezing point when it touches the windshield decreases, and the windshield fogs more easily. This makes it possible to determine whether or not the windshield will fog, based on the windshield temperature.

In the air conditioner, the temperature of the air blown into the compartment (or the defroster blown air temperature) fluctuates with the temperature of the engine water introduced into the hot water type heat exchanger 24. Hence, a correlation exists between the engine water temperature and the temperature of the windshield. Here, the temperature of the windshield is also influenced by the ambient temperature. In this embodiment, therefore, the temperature of the windshield is estimated from the different (TW−TAM) between the engine water temperature TW and the ambient temperature TAM.

At Step S300, more specifically, it is determined whether the difference of TW−TAM is no more than a predetermined value (e.g., 40° C. in this embodiment). Since the temperature of the windshield is low when the difference is no more than the predetermined value, it is determined that the windshield will fog. When the difference of TW−TAM is more than the predetermined value, it is determined that the windshield will not fog, because the temperature of the windshield is high.

When the decision at Step S300 is YES (that is, when it is determined that the windshield will fog), the routines advance to Step S150, at which the temperature of the evaporator 18 is controlled so that it may be no more than the predetermined level, as in FIG. 2.

When the decision of Step S300 is NO (that is, when it is determined that the windshield will not fog), the compressor discharge pressure Pd is controlled by Steps S310 to S370, but the evaporator temperature is not controlled.

As a result, the hot gas heating operation can be maximized to advance the rise of the compartment heating effect. Here, the control of the compressor discharge pressure Pd by Steps S310 to S370 will not be specifically described because it is similar to the interrupted control of the compressor based on the decision results of Steps S160 and S240.

[Fourth Embodiment]

In the aforementioned third embodiment, whether or not the windshield will fog is determined by estimating the temperature of the windshield based on the difference between the engine water temperature TW and the ambient temperature TAM. The temperature of the windshield can also be estimated exclusively from the engine water temperature TW, although the accuracy slightly drops.

Figure 9:
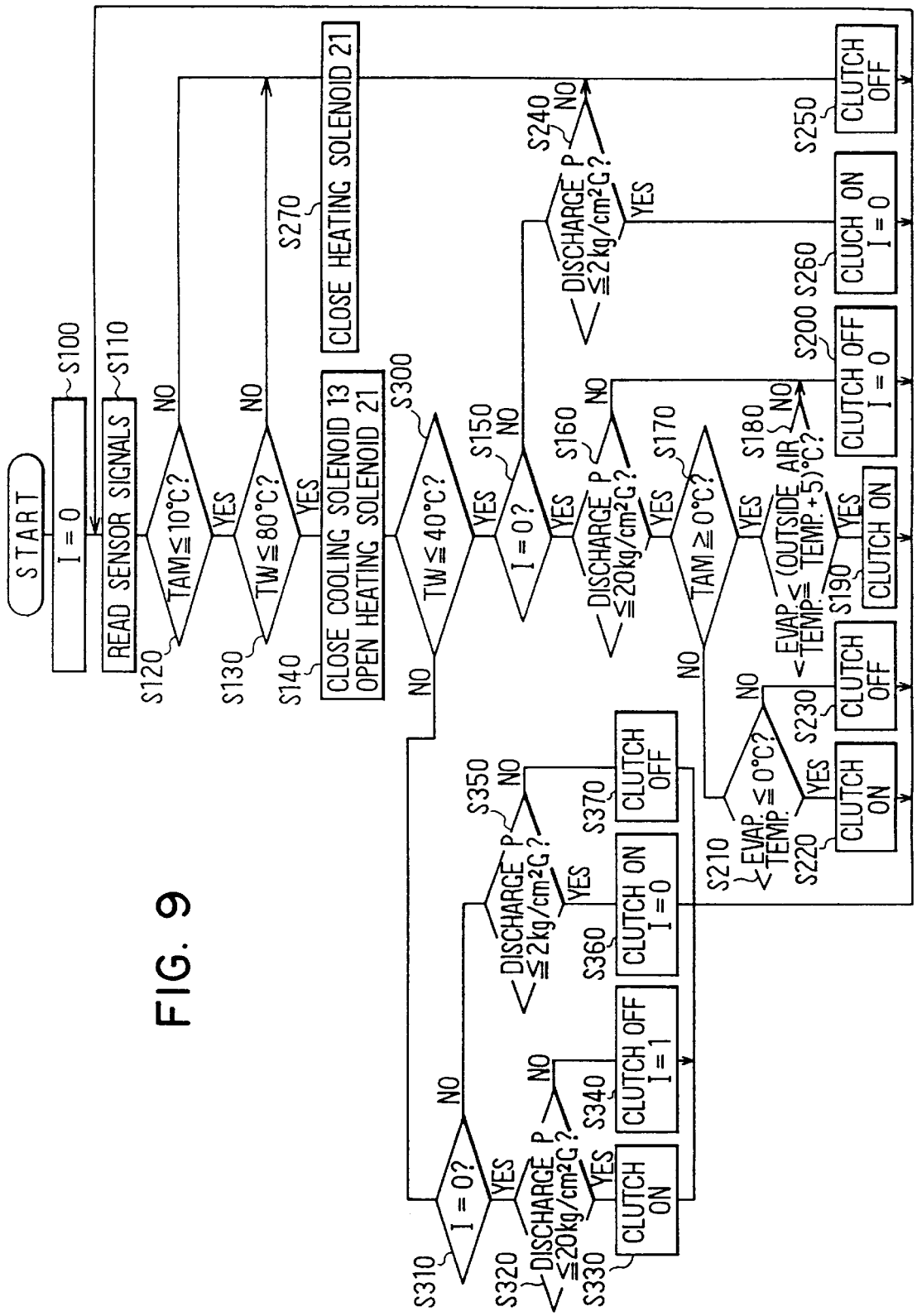
FIG. 9 is a flow diagram showing control in a heating mode by a fourth embodiment.

In this fourth embodiment, therefore, whether or not the windshield will fog is determined at Step S300, as shown in FIG. 9, by determining whether or not the engine water temperature TW is no more than a predetermined value (e.g., 40° C. in this embodiment)

As a modification of the fourth embodiment, moreover, whether or not the windshield will fog may be determined by estimating the temperature of the windshield exclusively based on the ambient temperature TAM. At Step S300, more specifically, whether or not the windshield will fog may be determined by determining whether or not the ambient temperature TAM is no less than a predetermined value.

[Fifth Embodiment]

Figure 10:
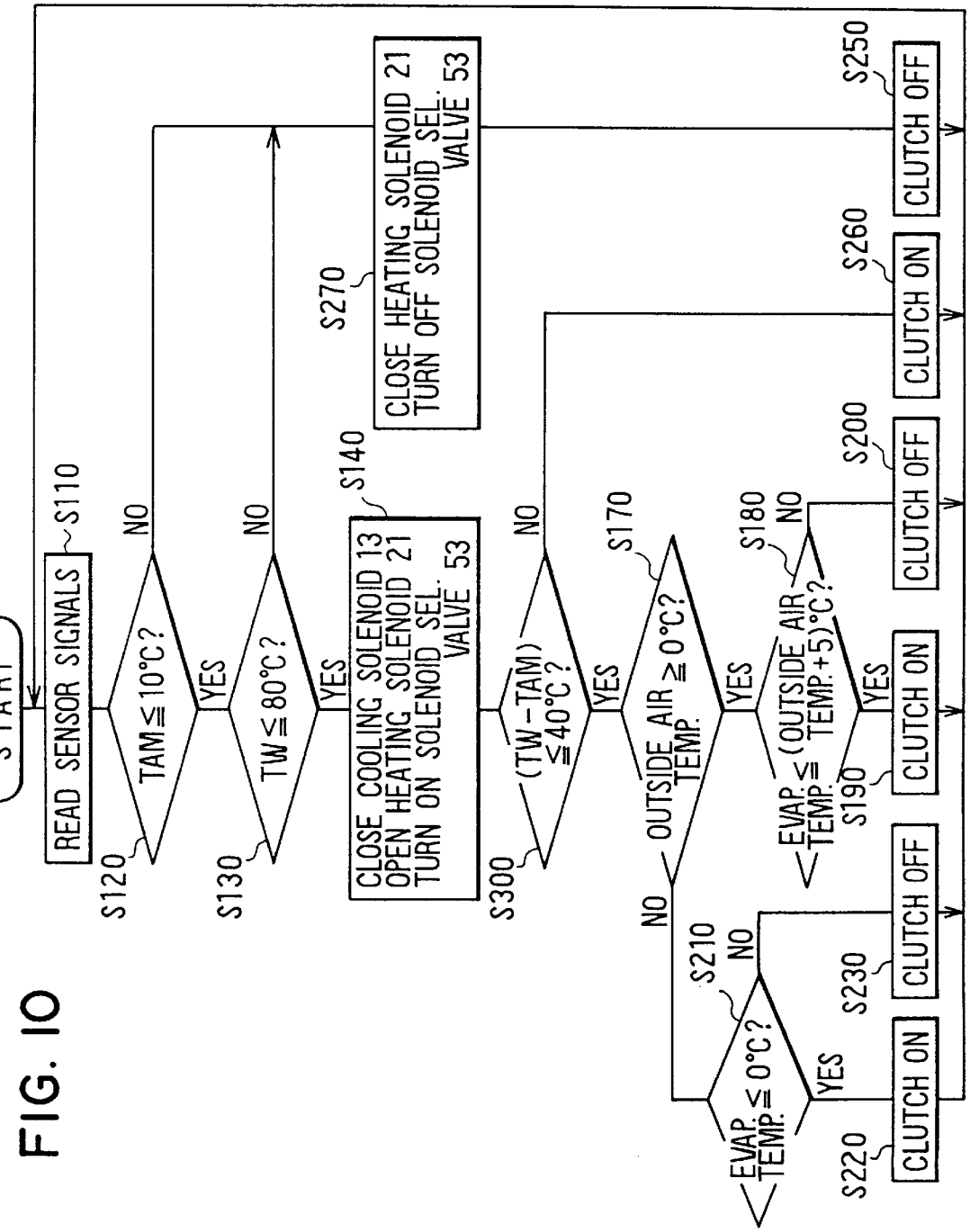
FIG. 10 is a flow diagram showing control in a heating mode by a fifth embodiment.

FIG. 10 shows this fifth embodiment which relates to a control of the case in which the variable displacement type compressor 10 shown in FIG. 4 is used. In the control example of FIG. 10, therefore, the ON/OFF control (or the interrupted compressor control) of the electromagnetic clutch 11 for controlling the compressor discharge pressure Pd is eliminated.

When the decision at Step S300 is NO (that is, when it is determined that the windshield will not fog), more specifically, the routines advance to Step S260, at which the electromagnetic clutch 11 is turned ON to leave the compressor 10 active. The control of the compressor discharge pressure Pd and the control of the evaporator temperature (i.e., the limit of the hot gas heating operation) of Steps S310 to S370 of FIG. 8 are not performed.

When the decision of Step S300 is YES (that is, when it is determined that the windshield will fog), the routine advances to Step S170, at and after which the control of the evaporator temperature is performed so that the temperature of the evaporator 18 may be no more than the predetermined value as in FIG. 2.

Here, since the fifth embodiment uses the variable displacement type compressor 10, the solenoid selector valve 53 is turned ON and OFF at Steps S140 and S270 as in FIG. 7.

[Sixth Embodiment]

Figure 11:
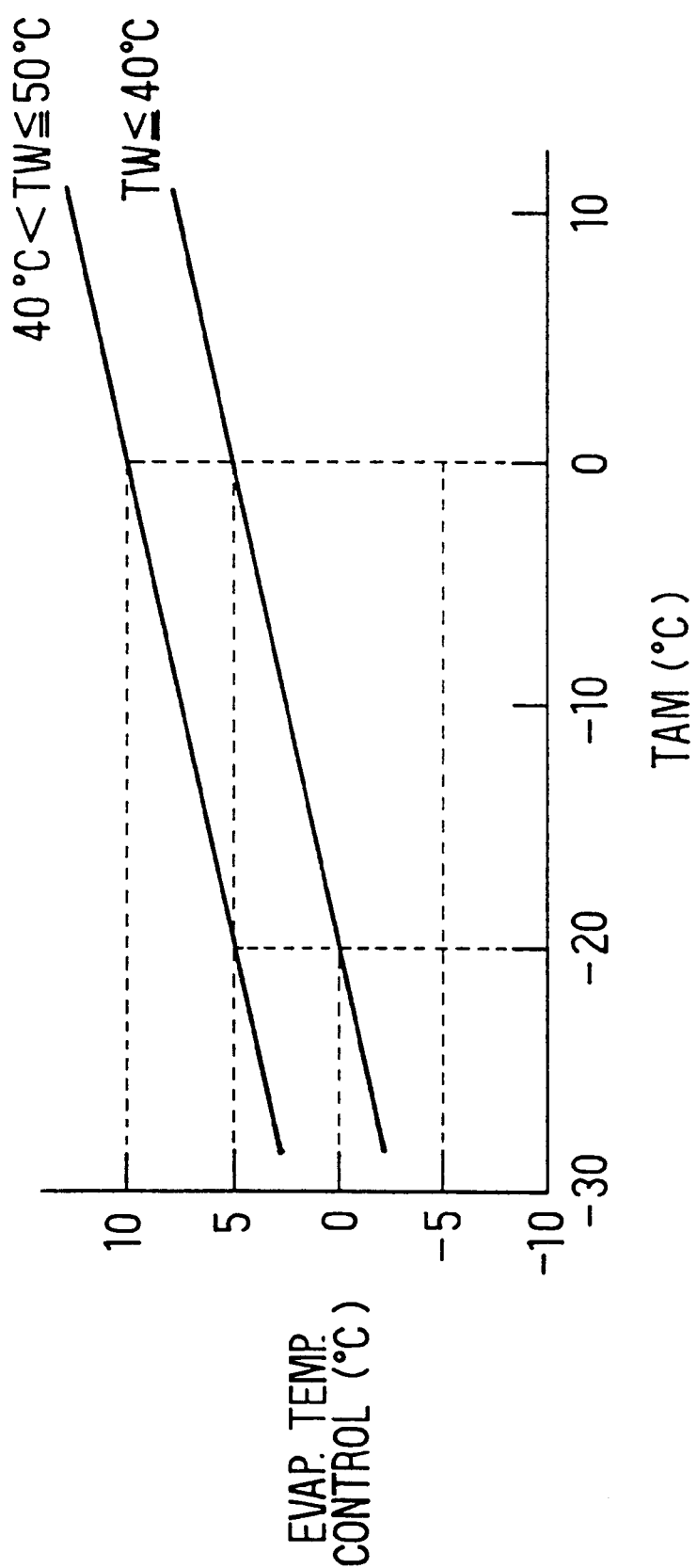
FIG. 11 is a characteristic diagram illustrating a method of determining an evaporator control temperature in a heating mode by a sixth embodiment.

FIG. 11 shows the sixth embodiment in which the control temperature of the evaporator 18 is determined based on the ambient temperature and the engine water temperature TW for limiting the hot gas heating operation, as shown in FIG. 11. However, the same control temperature is determined based on only the ambient temperature in the foregoing individual embodiments.

As the engine water temperature TW increases, the temperature of the air to be blown into the compartment increases to increase the temperature of the windshield and decrease the chances of the windshield fogging. In the control characteristics (or map) of FIG. 11, therefore, the hot gas heating performance is improved by raising the control temperature of the evaporator 18 not only with the rise in the ambient temperature but also with the rise in the engine water temperature TW.

Here in the example of FIG. 11, control of the evaporator temperature (i.e., the limit to the hot gas heating operation) is not performed when the engine water temperature TW exceeds 50° C.

[Seventh Embodiment]

Figure 12:
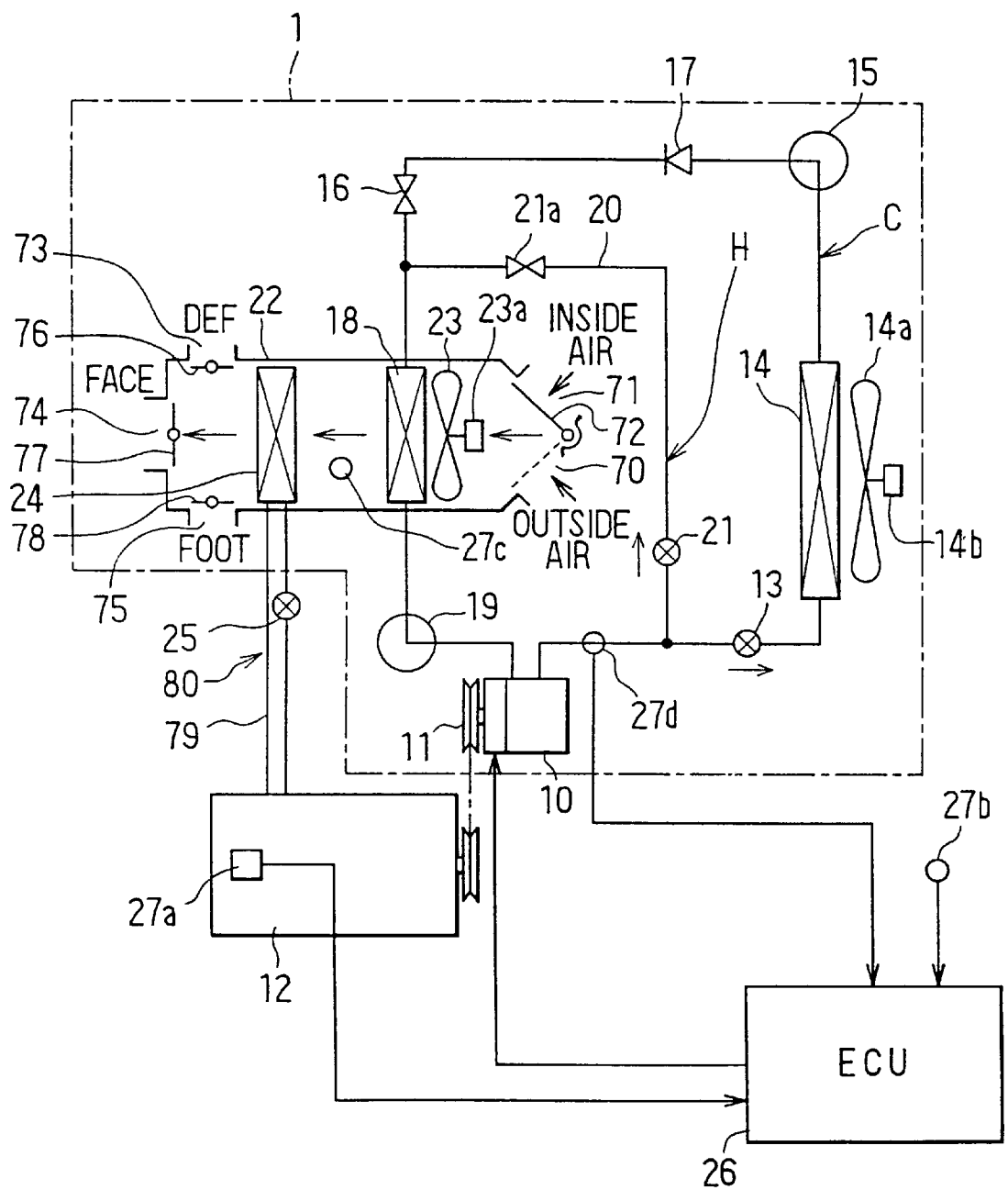
FIG. 12 is a system construction diagram showing the entire construction of a seventh embodiment of the invention.
Figure 13:
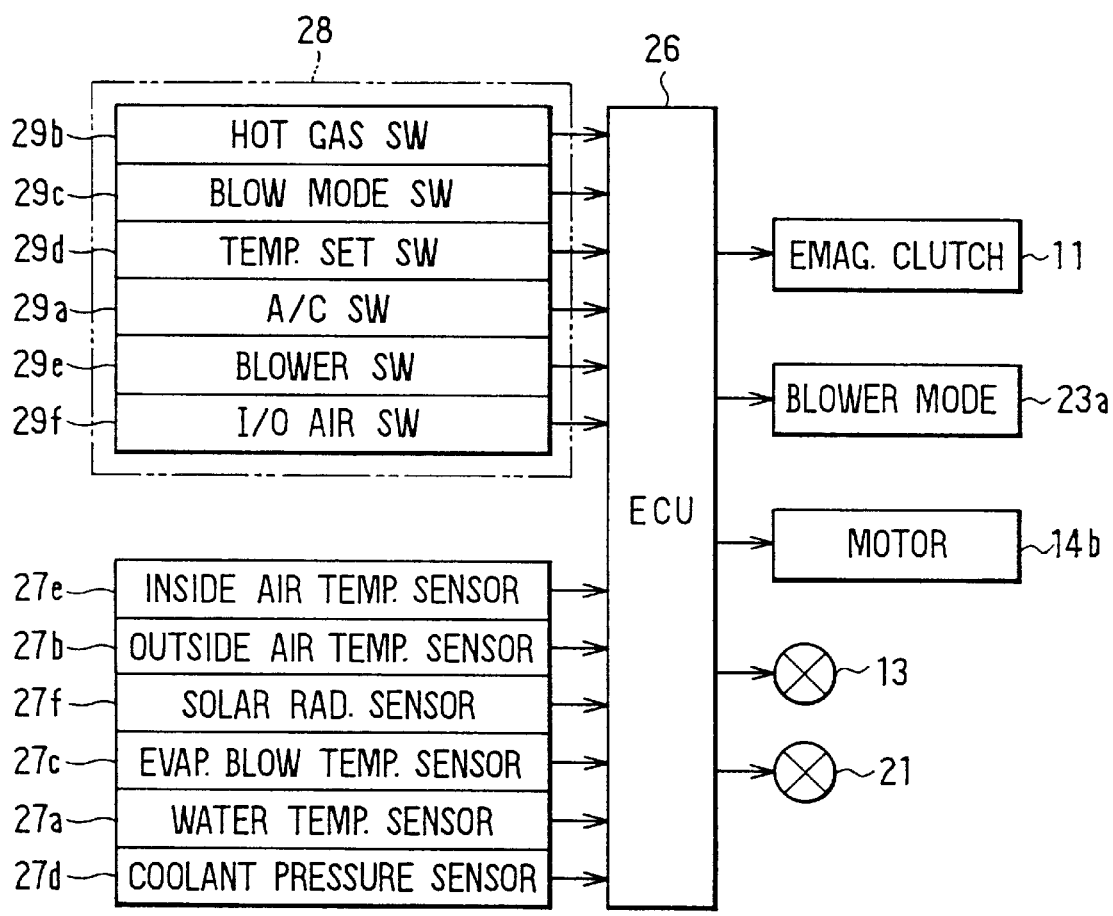
FIG. 13 is a block diagram of an electronic control system of the seventh embodiment.
Figure 14:
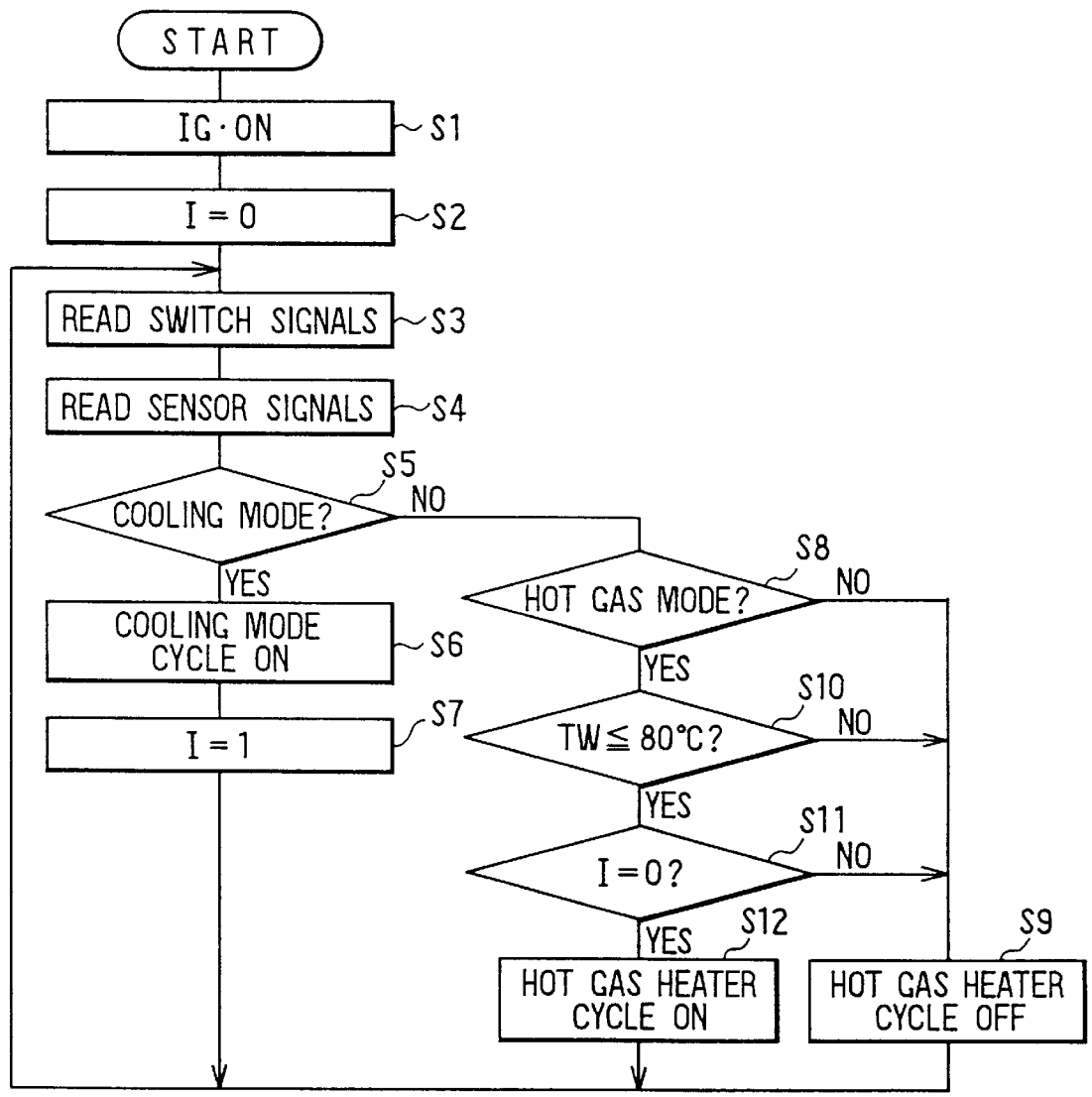
FIG. 14 is a flow diagram showing control by the seventh embodiment.

FIGS. 12–14 show the seventh embodiment, the entire system of which is shown in FIG. 12, although its description is omitted by designating the equivalent portions shown also in FIGS. 1 and 3 by common reference numerals. In FIG. 12, the check valve 17 is arranged at the upstream side of the thermal expansion valve 16.

The vehicle air conditioner according to the seventh embodiment is also constructed such that the individual air conditioning actuators in the air conditioning unit 1 are controlled by the ECU 26.

At the most upstream of the air in the air conditioner duct 22, an outside air suction port 70 for sucking the air outside of the compartment, an inside air suction port 71 for sucking the air inside of the compartment, and an inside/outside air switching door 72.

The inside/outside air switching door 72 forms an inside/outside air switch which is driven by an actuator such as a servo motor through a not-shown link mechanism for switching an outside air introduction (or FRS) mode for sucking air from at least the outside air suction port 70 and an inside air circulation (or REC) mode for sucking air from the inside air suction port 71.

At the most downstream of the air in the air conditioner duct 22, there are provided: a defroster (or DEF) blow port 73 for blowing the conditioned air toward the inner face of the front windshield of the vehicle; a face (or FACE) blow port 74 for blowing the conditioned air toward the head and body of a passenger; a foot (or FOOT) blow port 75 for blowing conditioned air toward the foot of the passenger; and a plurality of swingable mode switching doors 76 to 78 for selectively opening/closing the individual blow ports.

Here, these mode switching doors 76 to 78 are driven by actuators such as servo motors through the not-shown link mechanisms thereby to form blow port switches. With these mode switching doors 76 to 78, it is possible to switch: a face (FACE) mode for opening only the FACE blow port 74; a bi-level mode (B/L) mode for opening both the FACE blow port 74 and the FOOT blow port 75; a foot (FOOT) mode for opening only the FOOT blow port 75; a foot/defroster (F/D) mode for opening both the FOOT blow port 75 and the DEF blow port 73; and a defroster (DEF) mode for opening only the DEF blow port 73.

The blower 23, as located at the downstream side of the air flow of the inside/outside air switching door 72, is shown to be of the axial flow type for simplicity of illustration, but in fact is a blower having a centrifugal fan. This centrifugal blower 23 is rotationally driven by a blower motor 23a controlled by a blower drive circuit. Here, the centrifugal blower 23 of this embodiment can be switched in a stepwise manner or continuously from a 0-th (OFF) stage to a thirty second stage by adjusting a blower control voltage applied to the blower motor 23a.

Next, the hot water type heat exchanger 24 and the hot water valve 25 for re-heating air that has passed through the evaporator 18 are disposed midway through a cooling water circulating circuit 79 in which the hot water (or cooling water) is circulated by the (not-shown) water pump driven by the engine 12. The engine 12, the hot water type heat exchanger 24, the cooling water circulating circuit 79 and the hot water valve 25 thus far described thereby form a hot water type heater (or a main heater) 80.

The hot water valve 25 is opened always except at maximum cooling time in the cooling mode. By adjusting the degree of opening of the hot water valve 25, moreover, the flow rate of the hot water into the hot water type heat exchanger 24 can be adjusted to adjust the temperature of the air blown into the compartment.

Next, in the refrigerating cycle, the ordinary cooling refrigerating cycle C and the heating hot gas heater cycle H can be switched as in FIGS. 1 and 3 by the first and second solenoid valves (or the coolant circulating circuit switches) 13 and 21.

To the air conditioner ECU 26 for controlling the individual components in the air conditioner unit 1, switch control signals from the various control switches on the air conditioner control panel 28 are input. Here, in the air conditioner control panel 28, an air conditioner switch 29a is disposed for commanding the start or stop of the compressor 10 in the refrigerating cycle. This air conditioner switch 29a acts as a cooling switch for setting the cooling mode.

On the air conditioner control panel 28, moreover, the following components are disposed: a hot gas heating switch 29b for setting the heating mode by the hot gas heater cycle; a blow mode switching switch 29c for switching the air conditioning blow modes; a temperature setting switch 29d for setting the temperature in the compartment to a desired level; a blower switch 29e for selectively turning the blower 23 ON/OFF and switching the direction of the blown air; and an inside/outside air switching switch 29f for commanding the switching of the outside air introduction (FRS) mode and the inside air circulation (REC) mode.

The air conditioner ECU 26 includes a well-known microcomputer which includes a CPU, a ROM, a RAM and so on. The individual sensor signals of the individual sensors are input to the CPU after being A/D converted by not-shown input circuits. The air conditioner ECU 26 is constructed to start its control routines when DC power is supplied from the (not-shown) battery or a power source mounted on the automobile by turning ON (i.e., IG.ON) the ignition switch (or key switch) for starting/stopping the engine 12 of the automobile.

To the air conditioner ECU 26, moreover, sensor signals are input from: the cooling water temperature sensor 27a for detecting the temperature of the cooling water to flow into the hot water type heat exchanger 24; the ambient temperature sensor 27b; the evaporator blow temperature sensor 27c for detecting the temperature of the air just having passed through the evaporator 18; the coolant pressure sensor 27d for detecting the high pressure Pd of the refrigerating cycle; an inside air temperature sensor 27e for detecting the air temperature in the compartment; and a solar radiation sensor 27f for detecting the solar radiation entering the compartment.

Here, the aforementioned individual sensors detect the air conditioning environmental factors necessary for air conditioning the inside of the compartment of the automobile, and the aforementioned individual sensors 27a to 27c and 27e employ thermisters.

Operation of the seventh embodiment will now be described with reference to FIG. 14. When the ignition switch is turned ON (i.e., IG.ON), the engine 12 is started, and DC power is supplied to the air conditioner ECU 26 so that the routine of FIG. 14 is started (at Step S1). Initially, the routine is initialized by the flag I=0 (at Step S2).

Next, the switch signals of the individual switches on the air conditioner control panel 28 are read (at Step S3). Specifically, the ON signal or the OFF signal of the air conditioner switch 29a and the hot gas heating switch 29b are read. Next, the various sensor signals such as the cooling water temperature (TW) detected by the cooling water temperature sensor 27a are read (at Step S4).

Next, it is determined whether or not the refrigerating cycle is in the cooling mode. Specifically, it is determined at Step S5 whether the cooling mode is set by the air conditioner switch 29a. When this decision result is YES, the electromagnetic clutch 11 is energized to start the compressor 10 thereby to open the first solenoid valve 13 and close the second solenoid valve 21 so that the cooling mode is executed by the ordinary cooling refrigerating cycle C (Step S6). Next, the cooling operation flag is raised (I=1) (Step S7). After this, the routine returns to Step S3.

When the decision result of Step S5 is NO, that is, when the refrigerating cycle is not set in the cooling mode, it is then determined (at Step S8) whether or not the refrigerating cycle is set in the hot gas heating mode. Specifically, it is determined whether or not the hot gas switch 29b is turned (ON). When this decision result is NO, the heating operation of the hot gas heater cycle H is stopped (or turned OFF). Specifically, the power supply to the electromagnetic clutch 11 is stopped (or turned OFF) to stop the compressor 10 automatically and to close the first solenoid valve 13 and the second solenoid valve 21 (Step S9). After this, the routine returns to Step S3.

When the hot gas switch 29b is turned (ON), on the other hand, the decision result of Step S8 is YES, and it is determined whether or not the heating capacity of the inside of the compartment by the hot water type heat exchanger 24 of the hot water type heater 80 is insufficient. Specifically, it is determined at Step S10 whether the cooling water temperature (TW) of the engine 12 is no more than a predetermined value (e.g., 80° C.). When this decision result is NO, the heating capacity of the compartment is sufficient, and the routine advances to Step S9.

When the decision result of Step S10 is YES, it is determined whether the inner face of the front (or side)

windshield will fog. Specifically, it is determined whether no cooling mode has been performed after the ignition switch was turned ON (i.e., IG.ON). Specifically, it is determined whether or not the cooling mode flag has been reset (I=0) (Step S11).

When this decision result is NO, that is, when the flag I=1, the cooling mode has already been performed after the ignition switch was turned ON. It is, therefore, determined that the inner face of the front (or side) windshield will fog due to the evaporation of the condensed water, and the routine advances to the control operation of Step S9, and the hot gas heater cycle H is stopped (or restricted).

When the decision result of Step S11 is YES, no cooling mode has been performed, it is determined that the inner face of the front (or side) windshield will not fog, and the routine advances to Step S12, at which the electromagnetic clutch 11 is energized (or turned ON) to start the compressor 10 thereby to close the first solenoid valve 13 and open the second solenoid valve 21 so that the heating mode by the hot gas heater cycle H is executed (or turned ON). In short, Step S12 controls the heating mode. After this, the routine returns to Step S3.

The actions and effects of the seventh embodiment will now be described.

(A) Cooling Mode

When the refrigerating cycle is in the cooling mode, the electromagnetic clutch 11 is turned ON to open the first solenoid valve 13 and close the second solenoid valve 21. As a result, the hot and high-pressure gas coolant discharged from the compressor 10 circulates in the ordinary cooling refrigerating cycle C and flows into the evaporator 18. Thus, the evaporator 18 acts as a cooler for the cooling operation. As a result, the air sucked into the air conditioner duct 22 exchanges its heat with the coolant at a low temperature and under a low pressure in the evaporator 18 and is blown as cooled conditioned air into the compartment. As a result, the inside of the compartment is cooled.

(B) Heating Mode

When the operation mode of the refrigerating cycle is in the hot gas heating mode, the hot gas switch 29b is turned ON. When the cooling water temperature (TW) is no more than the predetermined value (e.g., 80° C.) so that the heating capacity of the hot water type heater 80 is insufficient, and when the inner face of the windshield will not fog, the electromagnetic clutch 11 is turned ON to close the first solenoid valve 13 and open the second solenoid valve 21.

As a result, the hot and high-pressure gas coolant discharged from the compressor 10 circulates in the hot gas heater cycle H and flows into the evaporator 18. Thus, the evaporator 18 acts as a radiator. The cooling water, which has absorbed the heat of the engine 12, circulates in the cooling water circulating passage 79 and flows into the hot water type heat exchanger 24. As a result, the air sucked into the air conditioner duct 22 is heated via heat exchange with the hot gas coolant in the evaporator 18 and is further heated via heat exchange with the hot cooling water in the hot water type heat exchanger 24. As a result, the heated air is blown into the compartment, and the compartment is heated.

Here, when air is conditioned in the cooling mode for the time period from when the engine 12 is started by turning ON the ignition switch to the time when the engine 12 is stopped, it is determined that the inner face of the front windshield is susceptible to fogging. Here, the cooling mode will be discussed in conjunction with a situation in which the compressor 10 has been operated for a predetermined time period (e.g., one minute) by turning ON the air conditioner (A/C) switch 29a.

This case can be exemplified even at an ambient temperature of 0° C. or lower, for example, when the mode is switched to the heater mode operation of the cooling mode for dehumidifying the inside of the compartment. That is, the refrigerating cycle is switched from the cooling refrigerating cycle C to the hot gas heater cycle H.

In this case, the moisture on the surface of the evaporator 18 may be evaporated again during cooling mode so that the air containing much moisture may be blown into the compartment to fog the inner windshield. However, once the moisture on the surface of the evaporator 18 is hard to evaporate at a low ambient temperature of no more than 0° C., and therefore remains for a long time on the surface of the evaporator 18. When the evaporator 18 is switched from the cooling mode to the heating mode, therefore, the inner surface of the windshield may fog.

In this embodiment, therefore, when at least one cooling (or dehumidifying) operation by the ordinary refrigerating cycle C is performed from the start (ON) to the stop (OFF) of the engine 12, the heating mode operation (or auxiliary heating operation) by the hot gas heater cycle H is not started even if the heating mode is set by the hot gas switch 29b.

As a result, air containing the moisture, as produced by the evaporation of the condensed water having resided for a long time on the surface of the evaporator 18, can be prevented from being blown at a high rate into the compartment. As a result, defogging performance of the inner face of the front windshield is enhanced.

When the heating mode operation of the hot gas heater cycle H is stopped, the inside of the compartment is heated exclusively by the heating capacity of the hot water heat exchanger 24.

Other examples of the device for determining the state of windshield fogging and the device for limiting heating mode operation by the hot gas heater cycle H are as follows.

[1] A blown air temperature sensor for detecting the temperature (Ta) of air blown into the compartment. Until the temperature of the conditioned air blown into the compartment becomes greater than a predetermined value, the temperature of the conditioned air to be blown from the DEF blow port 73 toward the inner face of the windshield is low, and the temperature of the windshield is also low. It is, therefore, determined by the air conditioner ECU 26 that the inner face of the windshield will fog.

Here, the temperature of the conditioned air to be blown into the compartment has a correlation to the cooling water temperature TW to be detected by the cooling water temperature sensor 27a. It may therefore be determined that the inner face of the windshield will fog until the cooling water temperature exceeds a predetermined value. Specific examples of control, as based on the above concept, will now be described.

Figure 15:
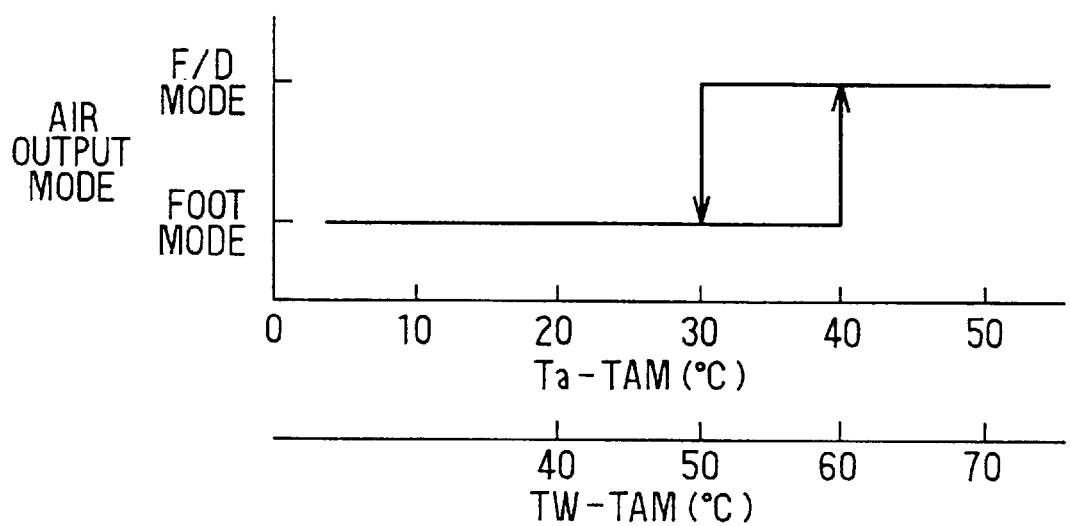
FIG. 15 is a diagram illustrating a specific example of the limit of a windshield fog determination and a hot gas heating mode operation by the seventh embodiment.

(1) When the difference between the temperature Ta of the conditioned air to be blown from the DEF blow port 73 toward the inner face of the front windshield and the ambient temperature TAM is smaller than a predetermined value (e.g., 30 to 40° C.), as illustrated in the characteristic diagram of FIG. 15, or when the difference between the cooling water temperature TW and the ambient temperature TAM is smaller than a predetermined value (e.g., 50 to 60° C.), it is determined that the inner face of the front windshield will fog. As a result, the FOOT mode is selected in which only the FOOT blow port 75 is opened, and the DEF blow port 73 is closed.

In short, the hot gas heating mode operation is limited by maintaining the DEF mode in an unselected state in which only the DEF blow port 73 is opened, and the F/D mode in which both the FOOT blow port 75 and the DEF blow port 73 are opened.

Here, when the difference between the temperature Ta of the conditioned air and the ambient temperature TAM (or the difference between the cooling water temperature TW and the ambient temperature TAM) exceeds the predetermined value, the limit to the hot gas heating mode operation is released by controlling the blow port switching doors 76 to 78 to switch the mode to the F/D mode.

The difference between the blow temperature Ta of the conditioned air to be blown from the DEF blow port 73 (i.e., the cooling water temperature TW) and the ambient temperature TAM is used to determine whether the windshield will fog. As the conditioned air temperature Ta or the cooling water temperature TW are individually correlated to the windshield temperature, however, whether the windshield will fog may be determined exclusively based on the blow temperature Ta or the cooling water temperature TW. Alternatively, whether the windshield will fog may also be determined exclusively based on the ambient temperature TAM.

When the conditioned air is to be blown in the FOOT mode at a low rate from the DEF blow port, the hot gas heating mode operation may be limited by selecting the FACE mode or the B/L mode.

Figure 16:
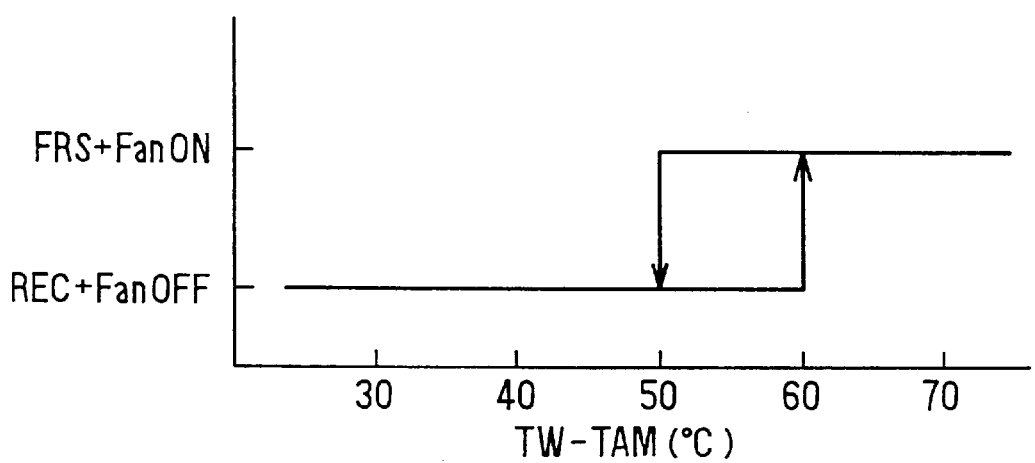
FIG. 16 is a diagram illustrating another example of the limit of the windshield fog determination and the hot gas heating mode operation by the seventh embodiment.

(2) In another example, when the difference between the cooling water temperature TW and the ambient temperature TAM is smaller than the predetermined value (e.g., 50 to 60° C.), as illustrated in FIG. 16, it is determined that the front windshield will fog. Then, the inside/outside air switching door 72 is controlled to switch the suction port mode to the inside air circulation (REC) mode, and the hot gas heating mode operation is limited by turning OFF the blower motor 23*a* to stop the action of the blower 23.

By this control, the air due to the pressure of the running vehicle will not pass through the evaporator 18 so that the windshield can be prevented from fogging.

When the difference between the cooling water temperature TW and the ambient temperature TAM exceeds a predetermined value, moreover, the limit to the hot gas heating mode operation is released by setting the suction port mode to the outside air introduction (FRS) mode and by turning ON the blower motor 23*a* to start the blower 23.

The temperature difference between the cooling water temperature TW and the ambient temperature TAM is used to determine whether the windshield will fog. In this case, too, the windshield fogging state may be determined exclusively based on the cooling water temperature TW, the ambient temperature TAM or the blow temperature Ta.

Figure 17:
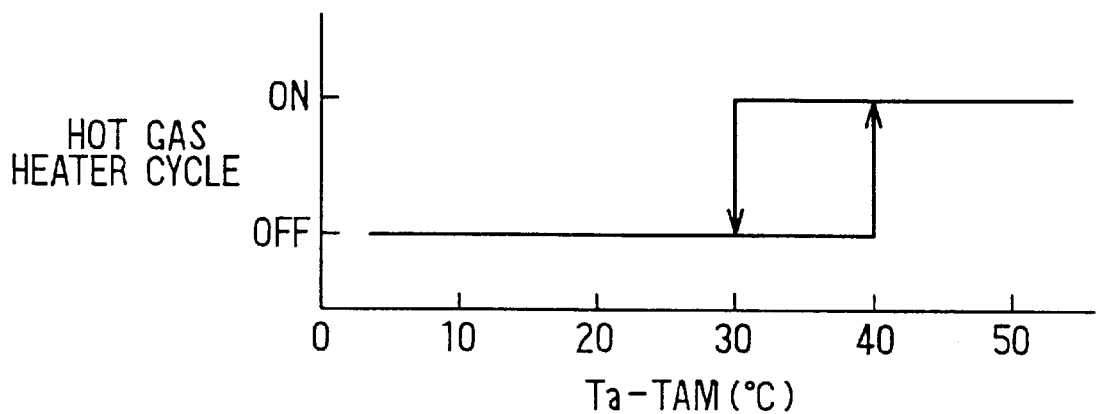
FIG. 17 is a diagram illustrating still another example of the limit of the windshield fog determination and the hot gas heating mode operation by the seventh embodiment.

(3) Next, when the difference between the blow temperature Ta (which may be the cooling water temperature TW) of the conditioned air (i.e., the conditioned air to be blown from the DEF blow port 73 toward the inner face of the front windshield) to be blown into the compartment and the ambient temperature TAM is smaller than the predetermined value (e.g., 30 to 40° C.), as illustrated in the FIG. 17, it is determined that the inner face of the front windshield will fog. Then, the hot gas heating mode operation is stopped (or turned OFF) by turning OFF the compressor 10.

Here, when the difference between the blow temperature Ta of the conditioned air (or the cooling water temperature TW) and the ambient temperature TAM exceeds the predetermined value, the hot gas heating mode operation is executed (or turned ON) by turning ON the compressor 10.

The temperature difference between the blow temperature Ta (or the cooling water temperature TW) of the conditioned air to be blown into the compartment and the ambient temperature TAM is used to determine whether the windshield will fog. However, the state for the windshield to fog may be determined exclusively based on the blow temperature Ta, the cooling water temperature TW or the ambient temperature TAM.

[2] In the flow diagram of FIG. 14, when one of the cooling or dehumidifying modes of the ordinary cooling refrigerating cycle C is executed to cause the evaporator 18 to act as the cooler from the start to the stop of the engine 12, the air conditioner ECU 26 determines that the inner face of the front windshield will fog, and stops the hot gas heating mode operation as one specific control example until the engine 12 is turned OFF (by turning OFF the ignition switch). To limit the heating mode operation, however, there may be adopted the aforementioned ones of the examples (1) and (2) of [1].

Figure 18:
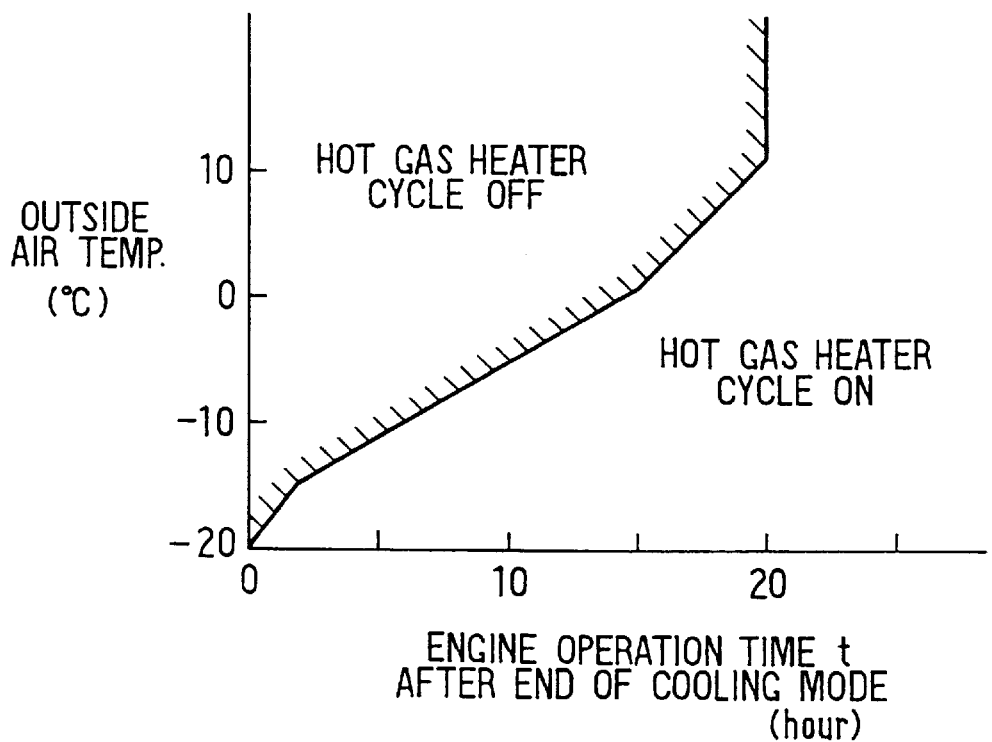
FIG. 18 is a diagram illustrating a further example of the limit of the windshield fog determination and the hot gas heating mode operation by the seventh embodiment.

[3] FIG. 18 is a diagram illustrating another way for determining the state for the windshield to fog. The abscissa of FIG. 18 indicates an engine operation time period t from the stop of the operation of the cooling mode. This time period t is an elapsed time period after the stop of the cooling mode and indicates the operation hysteresis of the cooling mode.

The air conditioner ECU 26 determines the state for the windshield to fog, from the ambient temperature TAM and the engine operation time period (or the elapsed time period) t after the stop of the cooling mode. Since more condensed water is produced in the cooling mode for the higher ambient temperature TAM, more specifically, the amount of evaporation of the moisture increases to fog the windshield for the higher ambient temperature TAM when the heating mode is started after the stop of the cooling mode.

As a result, the characteristics are made, as illustrated in FIG. 18, such that the range X estimated for the windshield to fog becomes wider for the engine operation time period t after the cooling mode stops for the higher ambient temperature TAM. In the example of FIG. 18, moreover, the air conditioner ECU 26 determines from the ambient temperature TAM and the engine operation time period t after the cooling mode stop whether or not the state after the cooling mode stop falls within the windshield fog estimated range X of FIG. 18. When the state falls within the region X, the compressor 10 is not started, thereby leaving the hot gas heater cycle H stopped (or OFF).

When the state after the cooling mode stop falls outside of the estimated fog region X of FIG. 18, namely, within a region Y, the compressor 10 is started to close the solenoid valve 13 and open the solenoid valve 21 to thereby operate (or turn ON) the hot gas heater cycle H.

Thus, the action (ON) and stop (OFF) of the hot gas heater cycle H can be controlled based on the estimated fog region X which is determined by the ambient temperature TAM and the engine operation time period t after the cooling mode stop.

Here, the amount of condensed water to be produced in the cooling mode is lower for the shorter operation time period of the last (or preceding) cooling mode. For the shorter operation time period of the cooling mode, therefore, the boundary line of the estimated fog region X of FIG. 18 may be corrected to the shorter side with respect to the engine operation time period t after the cooling mode stop.

Here in the example of FIG. 18, the operation (ON) and stop (OFF) of the hot gas heater cycle H are controlled based on the estimated fog region X. It is, however, quite natural that the way for limiting the heating mode operation can be exemplified by the (1) and (2) of [1] above in place of stopping the operation of the hot gas heater cycle H.

[4] When the passenger depresses the defroster (DEF) switch of the blow mode switching switch 29c of the air conditioner control panel 28 to issue the command signal for fixing the blow port mode in the DEF mode (that is, when the passenger recognizes that the windshield is fogging), the air conditioner ECU 26 determines that the inner surface of the front windshield will fog. When this determination is made, the heating mode operation by the hot gas heater cycle H is instantly stopped (OFF). Before the hot gas heating mode operation is started, on the other hand, the heating mode operation is not started.

[5] A humidity sensor may be disposed in the vicinity of the inner surface of the front windshield so that the fogging state of the front windshield may be determined by the air conditioner ECU 26 when the humidity in the vicinity of the inner face of the front windshield takes a value near 100% (such as 90%).

Here, the humidity of the air in the vicinity of the inner face of the front windshield may also be estimated from the blow temperature TE of the evaporator 18 and the temperature of the front windshield. Here, the temperature of the windshield can also be estimated not by detecting it with a dedicated sensor but from the ambient temperature, the vehicle operating conditions and so on.

[6] A temperature sensor may be disposed in the vicinity of the front (side) windshield to detect the temperature of the front windshield so that the ECU 26 can determine when the windshield temperature is lower than a predetermined value whether or not the inner face of the front windshield will fog. Here, the temperature of the front windshield may also be estimated from the ambient temperature, the vehicle speed, the blow rate (e.g., the blower control voltage to be applied to the blower motor) of the centrifugal fan 13, and the blow temperature of the conditioned air to be blown from the DEF blow port 73.

Here, even when the windshield fogging state is determined by the aforementioned [4], [5] and [6], the limit to the heating mode operation by the hot gas heater cycle H may also be performed, as in the foregoing examples, by stopping the operation of the hot gas heater cycle H or (1) and (2) of [1] so that its description is omitted.

When the ECU 26 determines that the windshield will fog (or is liable to fog), as described above, the vehicle air conditioner of the seventh embodiment limits the execution of the heating mode operation by the hot gas heater cycle H even if the hot gas heating switch 29b is depressed.

By executing at least one cooling (or dehumidifying) mode operation by the ordinary cooling refrigerating cycle C after the start of the engine 12, therefore, it is possible to prevent the condensed water on the surface of the evaporator 18 from evaporating again or to prevent high humidity air containing much water from being blown toward the windshield. As a result, it is possible to suppress the fogging of the windshield, as might otherwise be caused by high humidity blown air in the heating mode.

[Other Embodiments]

(1) The first and second solenoid valves 13, 21 in the foregoing embodiments can be replaced by one valve unit having a plurality of integrated passage switching functions.

(2) The foregoing embodiments have been described as having an air conditioner control panel provided with a dedicated switch that is manually operated by the passenger as the heating switch. However, this manually operated dedicated switch can also be replaced by another switch. When the heating manual switch for the idle-up of the vehicle engine 12 is disposed on the vehicle side, for example, the heating mode by the hot gas heater cycle may be started in association with the ON of that engine heating manual switch.

(3) When the engine 12 is automatically warmed up by determining the conditions necessary for the warming-up of the vehicle engine 12 by the (not-shown) engine electronic control unit, moreover, the heating mode of the hot gas heater cycle may be automatically started based on the warming-up signal in the engine electronic control unit.

(4) In the foregoing embodiments, the invention has been applied to the refrigerating cycle device of a vehicle air conditioner. However, the invention could also be applied to the refrigerating cycle device of an air conditioner for airplanes, ships or trains. Moreover, the invention could be applied further to the refrigerating cycle device of domestic or industrial-type air conditioner for factories, shops, houses, or the like.

While the above description is of the preferred embodiment of the present invention, the invention may be modified without departing from the proper scope or fair meaning of the accompanying claims. Other advantages of the present invention will become apparent to those skilled in the art after studying the foregoing text and drawings in conjunction with the following claims.

What is claimed is:

1. An air conditioner for inhibiting fogging of a vehicle windshield, comprising:
    a refrigerating cycle including an inside heat exchanger, a compressor, an outside heat exchanger, and first pressure reducing means connected in circuit;
    a hot gas heater cycle including said inside heat exchanger, said compressor, and second pressure reducing means connected in circuit, said hot gas heater cycle bypassing said outside heat exchanger;
    an air conditioner duct in which said inside heat exchanger is disposed for conditioning air blown therethrough; and
    control means including window fogging determining means for determining whether said windshield will fog, and for limiting operation of said hot gas heater cycle when said window fogging determining means determines that said windshield will fog.

2. An air conditioner according to claim 1,
    wherein said window fogging determining means determines whether the windshield will fog based on physical properties relating to windshield temperature.

3. An air conditioner according to claim 1,
    wherein said window fogging determining means determines whether the windshield will fog based on operation hysteresis of the refrigerating cycle in which said inside heat exchanger functions as an evaporator.

4. An air conditioner according to claim 1,
    further comprising air conditioner mode setting means for setting a defroster mode in which the blown air is blown from said air conditioner duct toward said windshield, and
    said window fogging determining means determines whether the windshield will fog in said defroster mode.

5. An air conditioner according to claim 1,
    wherein said window fogging determining means determines whether or not said windshield will fog based on physical properties relating to inside air humidity in proximity to the windshield.

6. An air conditioner according to claim 1,
    wherein said control means does not start said compressor when said control means determines that the windshield will fog.

7. An air conditioner according to claim 1, wherein said control means controls said compressor so that a temperature of said inside heat exchanger is no more than a predetermined value when said control means determines that said windshield will fog.

8. An air conditioner according to claim 7, wherein said control means controls said compressor so that the temperature of said inside heat exchanger is no more than 0° C. when an ambient temperature is no more than 0° C., and so that the temperature of said inside heat exchanger is equal to the ambient temperature when the ambient temperature is higher than 0° C.

9. An air conditioner according to claim 7, wherein said control means controls the temperature of said inside heat exchanger by interrupting operation of said compressor.

10. An air conditioner according to claim 1, wherein one of a defroster mode, in which the blown air is blown from said air conditioner duct toward the windshield, and another blow mode in which the blown air is blown from the air conditioner duct toward a passenger, is set; and wherein said control means selects said another blow mode when said control means determines that said windshield will fog.

11. A vehicle air conditioner according to claim 1, further comprising:

an inside air suction port for sucking inside air into said air conditioner duct, and an outside air suction port for sucking outside air into said air conditioner duct; and a blower for establishing a flow of said blown air in said air conditioner duct;

wherein said control means selects an inside air mode to open said inside air suction port and close said outside air suction port when said control means determines that said windshield will fog, and stops said blower.

12. An air conditioner according to claim 1, wherein said compressor is an engine-driven fixed displacement type compressor driven through a clutch, and wherein said control means controls said compressor during said heating mode by interrupting said clutch so that discharge pressure of said compressor falls within a predetermined range.

13. An air conditioner according to claim 1, wherein said compressor is a variable displacement type compressor having a displacement varying mechanism for varying discharge displacement, and wherein the discharge displacement is adjusted by said displacement varying mechanism so that the discharge pressure of said compressor falls within a predetermined range during operation of said heating mode.

14. An air conditioner according to claim 1, wherein said compressor is driven by a vehicle engine, and wherein a hot water type heat exchanger is disposed downstream of said inside heat exchanger in said air conditioner duct for heating the blown air via hot water from said vehicle engine.

15. An air conditioner, comprising:

a refrigerating cycle for operating an inside heat exchanger as an evaporator by returning a coolant, as discharged from a compressor, through an outside heat exchanger, first pressure reducing means and said inside heat exchanger to said compressor; and a hot gas heater cycle for operating said inside heat exchanger as a radiator by returning the coolant, as discharged from said compressor, through second pressure reducing means and said inside heat exchanger to said compressor while bypassing said outside heat exchanger, wherein said inside heat exchanger is disposed in an air conditioner duct through which blown air flows, wherein a cooling mode is executed by blowing air cooled by said inside heat exchanger of said refrigerating cycle, and a heating mode is executed by blowing air heated by said inside heat exchanger of said hot gas heater cycle, and wherein control means is provided for controlling said compressor during operation of said heating mode so that a temperature of said inside heat exchanger may be no more than a predetermined value.

16. A vehicle air conditioner, comprising:

a cooling mode circuit;

a heating mode circuit;

said cooling and heating mode circuits having a common inside heat exchanger that operates as an evaporator during operation of the cooling mode, and that operates as a radiator during the heating mode;

a controller that determines whether a vehicle windshield fogging condition exists, and that controls the cooling and heating mode circuits to inhibit windshield fogging;

wherein the cooling and heating mode circuits also include a common fixed type compressor, said controller controlling operation of said compressor to control a temperature of said common inside heat exchanger to inhibit said windshield fogging;

wherein the controller controls operation of the cooling and heating mode circuits based on an estimated windshield temperature to inhibit said windshield fogging; and wherein the estimated windshield temperature is determined from a difference between engine cooling water temperature and outside air temperature.

17. A vehicle air conditioner, comprising:

a cooling mode circuit;

a heating mode circuit;

said cooling and heating mode circuits having a common inside heat exchanger that operates as an evaporator during operation of the cooling mode, and that operates as a radiator during the heating mode;

a controller that determines whether a vehicle windshield fogging condition exists, and that controls the cooling and heating mode circuits to inhibit windshield fogging;

wherein the cooling and heating mode circuits also include a common fixed type compressor, said controller controlling operation of said compressor to control a temperature of said common inside heat exchanger to inhibit said windshield fogging;

wherein the controller controls operation of the cooling and heating mode circuits based on an estimated windshield temperature to inhibit said windshield fogging; and wherein the estimated windshield temperature is determined from engine cooling water temperature.

18. A vehicle air conditioner, comprising:

a cooling mode circuit;

a heating mode circuit;

said cooling and heating mode circuits having a common inside heat exchanger that operates as an evaporator during operation of the cooling mode, and that operates as a radiator during the heating mode;

a controller that determines whether a vehicle windshield fogging condition exists, and that controls the cooling and heating mode circuits to inhibit windshield fogging;

wherein the cooling and heating mode circuits also include a common variable type compressor, said controller controlling operation of said compressor to control a temperature of said common inside heat exchanger to inhibit said windshield fogging; and wherein the estimated windshield temperature is determined from a difference between engine cooling water temperature and outside air temperature.

19. A vehicle air conditioner, comprising:

a cooling mode circuit;

a heating mode circuit;

said cooling and heating mode circuits having a common inside heat exchanger that operates as an evaporator during operation of the cooling mode, and that operates as a radiator during the heating mode;

a controller that determines whether a vehicle windshield fogging condition exists, and that controls the cooling and heating mode circuits to inhibit windshield fogging; and wherein the controller controls a temperature of the inside heat exchanger based on mapped values of both engine cooling water temperature and outside air temperature.

20. A vehicle air conditioner, comprising:

a cooling mode circuit;

a heating mode circuit;

said cooling and heating mode circuits having a common inside heat exchanger that operates as an evaporator during operation of the cooling mode, and that operates as a radiator during the heating mode;

a controller that determines whether a vehicle windshield fogging condition exists, and that controls the cooling and heating mode circuits to inhibit windshield fogging; and a plurality of air outlets through which the blown air is selectively output, the controller inhibiting the blown air from being output through one or more of the air outlets when the controller determines that the windshield fogging condition exists at the one or more of the air outlets.

* * * * *